US012535841B2

(12) United States Patent
Nam et al.

(10) Patent No.: US 12,535,841 B2
(45) Date of Patent: Jan. 27, 2026

(54) REGULATOR CIRCUIT FOR PARALLEL CONFIGURATION AND USER DEVICE INCLUDING THE SAME

(71) Applicant: Samsung Electronics Co., Ltd., Suwon-si (KR)

(72) Inventors: Hyunseok Nam, Suwon-si (KR); Seongmun Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 291 days.

(21) Appl. No.: 18/336,278

(22) Filed: Jun. 16, 2023

(65) Prior Publication Data

US 2024/0210976 A1 Jun. 27, 2024

(30) Foreign Application Priority Data

Dec. 23, 2022 (KR) ........................ 10-2022-0183631

(51) Int. Cl.
*G05F 1/565* (2006.01)
*G05F 1/575* (2006.01)

(52) U.S. Cl.
CPC .............. *G05F 1/565* (2013.01); *G05F 1/575* (2013.01)

(58) Field of Classification Search
CPC .......... G05F 1/561; G05F 1/565; G05F 1/575; G05F 1/573; G05F 1/577; G05F 1/56; G05F 1/59
See application file for complete search history.

(56) References Cited

U.S. PATENT DOCUMENTS

| | | | | |
|---|---|---|---|---|
| 7,508,179 B2 * | 3/2009 | Cowell | G05F 1/56 323/275 |
| 7,759,916 B2 * | 7/2010 | Kleveland | H02M 3/1584 323/268 |
| 10,599,171 B2 | 3/2020 | Wang et al. | |
| 10,627,842 B2 | 4/2020 | Lu et al. | |
| 11,372,436 B2 | 6/2022 | Ahmed | |
| 11,422,578 B2 | 8/2022 | Liu et al. | |
| 2010/0164289 A1 * | 7/2010 | Umminger | G05F 1/565 307/55 |

(Continued)

FOREIGN PATENT DOCUMENTS

| | | |
|---|---|---|
| CN | 114415772 A | 4/2022 |
| CN | 112445262 B | 5/2022 |

(Continued)

OTHER PUBLICATIONS

Extended European Search Report issued Jul. 9, 2024 in European Application No. 23204329.9.

(Continued)

*Primary Examiner* — Sisay G Tiku
(74) *Attorney, Agent, or Firm* — Harness, Dickey & Pierce, P.L.C.

(57) ABSTRACT

A regulator circuit includes a first linear regulator circuit, configured to control a voltage on an output node based on a first reference voltage and to provide first current to the output node, and a second linear regulator circuit, connected in parallel to the first linear regulator circuit and configured to provide second current to the output node, and the second linear regulator circuit is further configured to control a magnitude of the second current based on a magnitude of the first current.

19 Claims, 16 Drawing Sheets

(56) References Cited

U.S. PATENT DOCUMENTS

| | | | | |
|---|---|---|---|---|
| 2013/0169246 | A1* | 7/2013 | Shao | G05F 1/563 323/266 |
| 2017/0255214 | A1* | 9/2017 | Ho | G05F 1/56 |
| 2019/0079552 | A1* | 3/2019 | Yasusaka | G05F 1/461 |
| 2020/0064876 | A1 | 2/2020 | Ogura | |
| 2021/0257912 | A1* | 8/2021 | Puggelli | H02M 1/0025 |
| 2022/0239144 | A1 | 7/2022 | Begino, III et al. | |
| 2022/0334604 | A1 | 10/2022 | Kim et al. | |
| 2022/0404850 | A1* | 12/2022 | Guan | G05F 1/563 |
| 2023/0176601 | A1* | 6/2023 | Bellotti | G11C 16/12 |

FOREIGN PATENT DOCUMENTS

| | | | |
|---|---|---|---|
| EP | 3 584 668 | A1 | 12/2019 |
| EP | 03904999 | A1 | 11/2021 |
| EP | 02798729 | B1 | 5/2022 |
| KR | 10-2019-0142724 | A | 12/2019 |
| WO | 2022/0266573 | A1 | 12/2022 |

OTHER PUBLICATIONS

Partical Search Report dated Mar. 27, 2024 in European Application No. 23204329.9.

* cited by examiner

REGULATOR CIRCUIT FOR PARALLEL CONFIGURATION AND USER DEVICE INCLUDING THE SAME

CROSS-REFERENCE TO RELATED APPLICATION(S)

This application claims benefit of priority to Korean Patent Application No. 10-2022-0183631, filed on Dec. 23, 2022, in the Korean Intellectual Property Office, the disclosure of which is incorporated herein by reference in its entirety.

BACKGROUND

The present disclosure relates to a regulator circuit for parallel configuration.

A voltage regulator is used to provide a constant voltage to a circuit. A linear regulator is a type of voltage regulator and is used to stably supply power to various types of electronic devices. For example, a linear regulator may be used in a power management integrated circuit (PMIC) of a mobile device such as a smartphone or a tablet PC.

SUMMARY

Example embodiments provide a regulator circuit for reducing power loss while increasing output current.

According to an example embodiment, a regulator circuit includes a first linear regulator circuit, configured to control a voltage on an output node based on a first reference voltage and to provide first current to the output node, and a second linear regulator circuit, connected in parallel to the first linear regulator circuit and configured to provide second current to the output node, and the second linear regulator circuit is further configured to control a magnitude of the second current based on a magnitude of the first current.

According to an example embodiment, a regulator circuit includes a first linear regulator circuit to an n-th linear regular circuit, n being an integer greater than or equal to 3. The first linear regulator circuit to the n-th linear regulator circuit may be connected to an output node in parallel, and may respectively provide first current to n-th current to the output node. The first linear regulator circuit is configured to control a voltage on the output node based on a first reference voltage, and the second linear regulator circuit to the n-th linear regulator circuit are configured to control magnitudes of the second current to the n-th current based on a magnitude of the first current.

According to an example embodiment, a linear regulator circuit includes a first voltage compensator configured to generate a first error voltage based on a difference between a first reference voltage and a first feedback voltage, a first power transistor connected between an output node and a power supply voltage terminal and configured to receive the first error voltage, a first switching circuit configured to select one of a plurality of input voltages in response to a selection control signal and to provide the first reference voltage to the voltage compensator, and a second switching circuit configured to provide either one of a voltage sensing feedback voltage and a first current sensing feedback voltage based on first current flowing to the output node as the first feedback voltage, the voltage sensing feedback voltage being a division of a voltage on the output node.

According to an example embodiment, a user device includes a power management integrated circuit, configured to generate a power supply voltage, and an application processor configured to receive the power supply voltage from the power management integrated circuit. The power management integrated circuit may include a first linear regulator circuit to an n-th linear regulator circuit, n being an integer greater than or equal to 2, the first linear regulator circuit to the n-th linear regulator circuit may be connected to an output node in parallel and may respectively configured to provide first current to n-th current to the output node, the first linear regulator circuit configured to control a voltage on the output node based on a first reference voltage, and the second linear regulator circuit configured to the n-th linear regulator circuit may control second current to n-th current based on a magnitude of the first current.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, example embodiments will be described with reference to the accompanying drawings.

Figure 1:
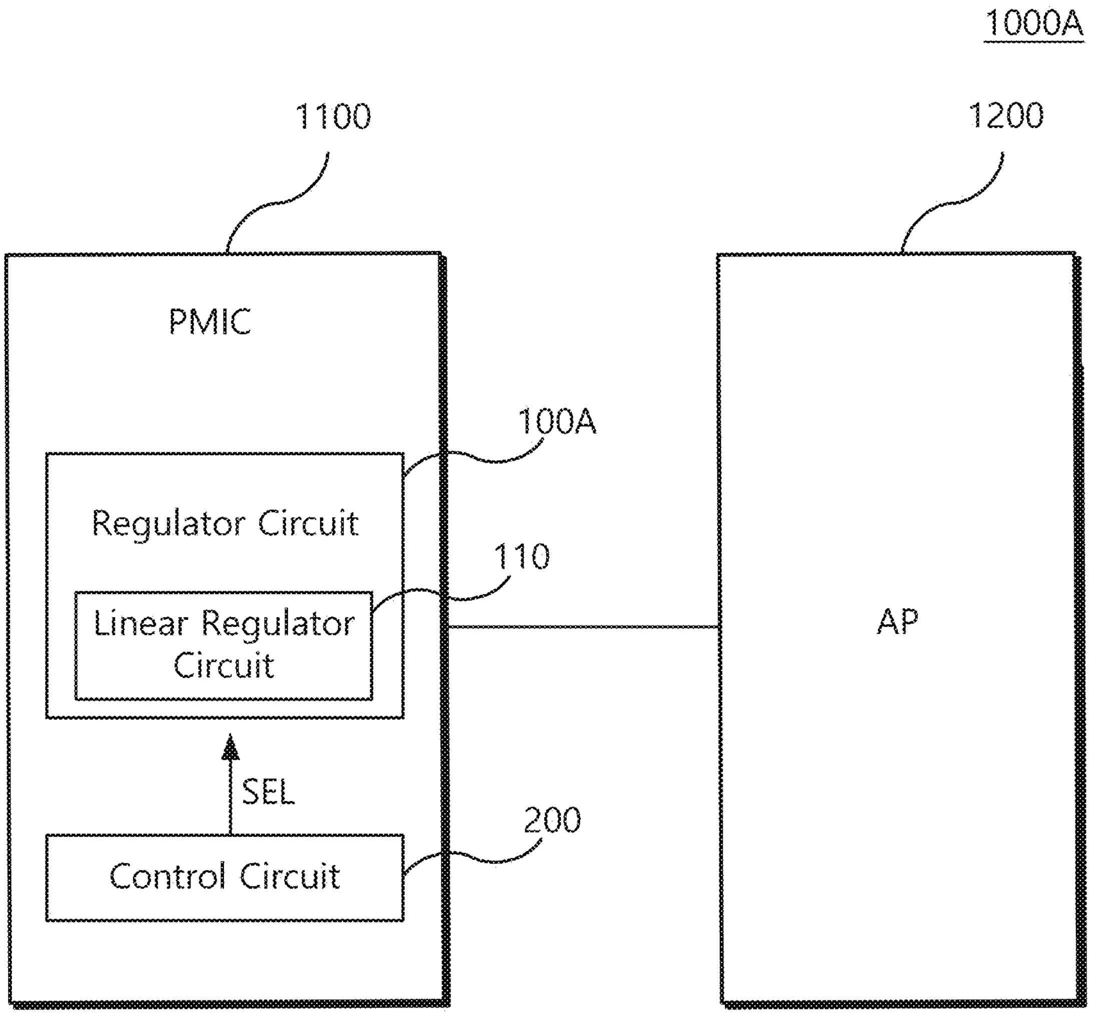
FIG. 1 is a block diagram illustrating a user device according to an example embodiment.

FIG. 1 is a block diagram illustrating a user device 1000A according to an example embodiment. Referring to FIG. 1, a user device 1000A may include a power management integrated circuit (PMIC) 1100 and an application processor (AP) 1200.

The power management integrated circuit 1100 may provide a power supply voltage to the application processor 1200 through a power supply line. The application processor 1100 may be a processor (or other processing circuitry) used in a mobile device such as a smartphone, a tablet personal computer (PC), or the like.

The power management integrated circuit 1100 may include various internal circuits. The power management integrated circuit 1100 may include a regulator circuit 100A, stably supplying current required (or alternatively, used) by the application processor 1200, and a control circuit 200 transmitting a control signal to an internal circuit of the power management integrated circuit 1100.

In an example embodiment, the regulator circuit 100A may include at least one linear regulator circuit 110. The linear regulator circuit 110 may provide output current to an output node. In an example embodiment, the linear regulator circuit 110 may be a low drop-out (LDO) regulator.

The linear regulator circuit 110 may receive a selection control signal SEL from the control circuit 200. The linear regulator circuit 110 may perform an operation to adjust a magnitude of an output voltage or to adjust a magnitude of output current, based on the select control signal SEL. Restated, the linear regulator circuit 110 may adjust a magnitude of an output voltage and/or adjust a magnitude of output current based on the selection control signal SEL.

In an example embodiment, when the selection control signal SEL is a first signal, the linear regulator circuit 110 may operate as a linear regulator circuit controlling an output voltage on an output node. For example, the linear regulator circuit 110 may be implemented alone without other linear regulators. In this case, the first signal may be applied as the selection control signal SEL. The linear regulator circuit 110 may perform an operation to control the magnitude of the output voltage in response to the first signal, the selection control signal SEL. Restated, the linear regulator circuit 110 may control the magnitude of the output voltage in response to the first signal and/or the selection control signal SEL As another example, the linear regulator circuit 110 may be a main linear regulator circuit, among a plurality of linear regulator circuits electrically connected to each other. In this case, the first signal may be applied as the selection control signal SEL. The linear regulator circuit 110 may perform an operation to control the magnitude of the output voltage in response to the first signal, the selection control signal SEL. Restated, the linear regulator circuit 110 may control the magnitude of the output voltage in response to the first signal and/or the selection control signal SEL.

In an example embodiment, when the selection control signal SEL is a second signal, the linear regulator circuit 110 may operate as a linear regulator circuit controlling a magnitude of output current. For example, the linear regulator circuit 110 may be a sub-linear regulator circuit among the plurality of linear regulator circuits electrically connected to each other. In this case, the second signal may be applied as the selection control signal SEL. The linear regulator circuit 110 may perform an operation to control the magnitude of the output current in response to the second signal, the selection control signal SEL. Restated, the linear regulator circuit 110 may control the magnitude of the output current in response to the second signal and/or the selection control signal SEL.

As described above, the linear regulator circuit 110 according to an embodiment may perform an operation to adjust the magnitude of the output voltage or the magnitude of the output current, based on the selection control signal SEL. Restated, the linear regulator circuit 110 may adjust the magnitude of the output voltage an/or the magnitude of the output current based on the selection control signal SEL. Accordingly, the linear regulator circuit 110 may operate alone, or may be electrically connected to other linear regulator circuits to operate as a main linear regulator circuit or a sub-linear regulator circuit.

Figure 2:
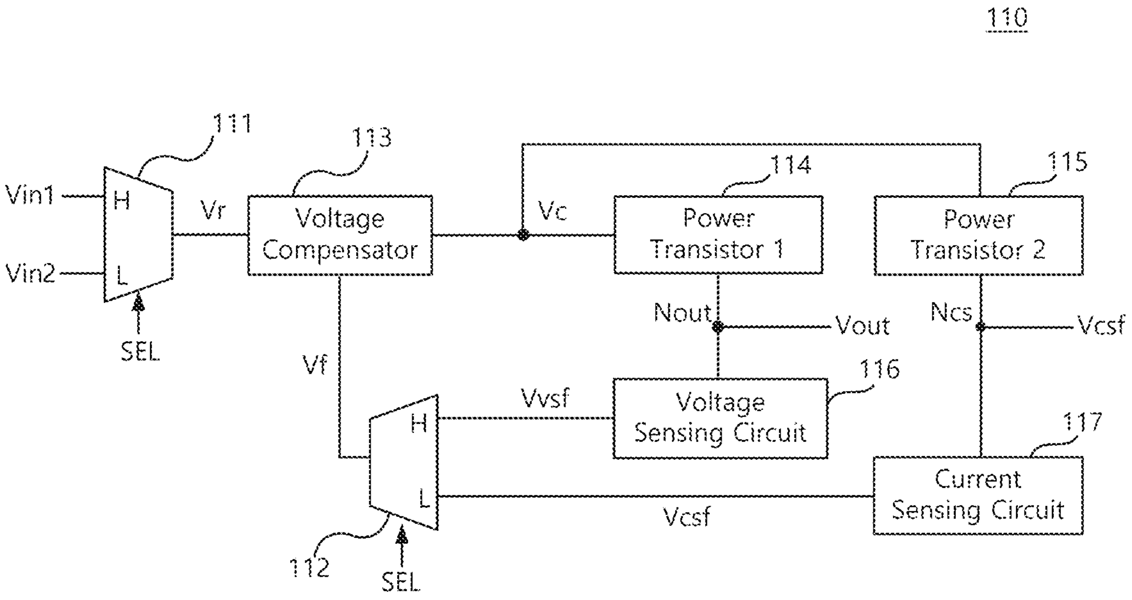
FIG. 2 is a diagram illustrating a linear regulator circuit according to an example embodiment.

FIG. 2 is a diagram illustrating a linear regulator circuit 110 according to an example embodiment.

Referring to FIG. 2, the linear regulator circuit 110 may include a first switching circuit 111, a second switching circuit 112, a voltage compensator 113, a first power transistor 114, a second power transistor 115, a voltage sensing circuit 116, and a current sensing circuit 117.

The first switching circuit 111 may select an input voltage, among a plurality of input voltages, in response to a selection control signal SEL and may provide the selected voltage to the voltage compensator 113 as a reference voltage Vr. The plurality of input voltages may include a first input voltage Vin1 and a second input voltage Vin2. The first input voltage Vin1 may be a voltage associated with a target voltage, and the target voltage may correspond to a voltage on an output node Nout required (or alternatively, used) by the application processor 1200 (see FIG. 1). The second input voltage Vin2 may be a voltage associate with target current, and the target current may correspond to output current required (or alternatively, used) by the application processor 1200. Restated, the target current may be a desired current supply level for the application processor 1200.

In FIG. 2, the first switching circuit 111 is illustrated as being a multiplexer MUX, but example embodiments are not limited thereto. According to example embodiments, the first switching circuit 111 may be implemented as another component selecting an input voltage, among a plurality of input voltages, which will be appreciated by a person of ordinary skill in the art.

In an example embodiment, the first switching circuit 111 may receive a selection control signal SEL at a high level. The selection control signal SEL at the high level may be referred to as a first signal. In this case, the first switching circuit 111 may select a first input voltage Vin1 associated with a target voltage in response to a first signal, and may provide the selected first input voltage Vin1 to the voltage compensator 113 as a reference voltage Vr.

In an example embodiment, the first switching circuit 111 may receive a selection control signal SEL at a low level. The selection control signal SEL at the low level may be referred to as a second signal. In this case, the first switching circuit 111 may select a second input voltage Vin2 associated with target current, and may provide the selected second input voltage Vin2 to the voltage compensator 113 as a reference voltage Vr.

The second switching circuit 112 may select either one of a voltage sensing feedback voltage Vvsf or a current sensing feedback voltage Vcsf in response to the selection control signal SEL, and may provide the selected voltage to the voltage compensator 113 as a feedback voltage Vf.

In an example embodiment, the second switching circuit 112 may receive the selection control signal SEL at the high level, for example, the first signal. In this case, the second switching circuit 112 may select the voltage sensing feedback voltage Vvsf in response to the first signal and may provide the selected voltage to the voltage compensator 113 as a feedback voltage Vf. Thus, the second switching circuit 112 may provide the feedback voltage Vf based on the first signal.

In an example embodiment, the second switching circuit 112 may receive the selection control signal SEL at the low level, for example, the second signal. In this case, the second switching circuit 112 may select a current sensing feedback voltage Vcsf in response to the second signal and may provide the selected voltage to the voltage compensator 113 as a feedback voltage Vf. Thus, the second switching circuit 112 may provide the feedback voltage Vf based on the second signal.

In FIG. 2, each of the first and second switching circuits 111 and 112 is illustrated as being a multiplexer MUX, but example embodiments are not limited thereto. According to example embodiments, each of the first and second switching circuits 111 and 112 may be implemented as another component selecting a voltage, among a plurality of voltages, which will be appreciated by a person of ordinary skill in the art.

The voltage compensator 113 may receive the reference voltage Vr and the feedback voltage Vf. The voltage compensator 113 may generate an error voltage Vc based on a difference between the reference voltage Vr and the feedback voltage Vf. The voltage compensator 113 may provide the error voltage Vc to each of the first power transistor 114 and the second power transistor 115.

The first power transistor 114 may be connected between an output node Nout, on which the output voltage Vout is generated, and a power supply voltage terminal. The first power transistor 114 may receive the error voltage Vc from the voltage compensator 113, and may provide current from the power supply voltage terminal to the output node Nout based on a level of the received error voltage Vc. In this case, a magnitude of the current provided to the output node Nout may be determined depending on the level of the error voltage Vc.

The second power transistor 115 may receive the error voltage Vc from the voltage compensator 113. The second power transistor 115 may mirror output current of the first power transistor 114 to generate mirroring current. Such mirroring current may be provided to the current sensing circuit 117.

The voltage sensing circuit 116 may be disposed between an output node Nout and a ground terminal. The voltage sensing circuit 116 may sense a level of a voltage on the output node Nout to generate a voltage sensing feedback voltage Vvsf.

The current sensing circuit 117 may receive the mirroring current provided from the second power transistor 115. The current sensing circuit 117 may generate a current sensing feedback voltage Vcsf1 based on the mirroring current. The current sensing circuit 117 may the current sensing feedback voltage Vcsf1 to the second switching circuit 112.

Figure 3A:
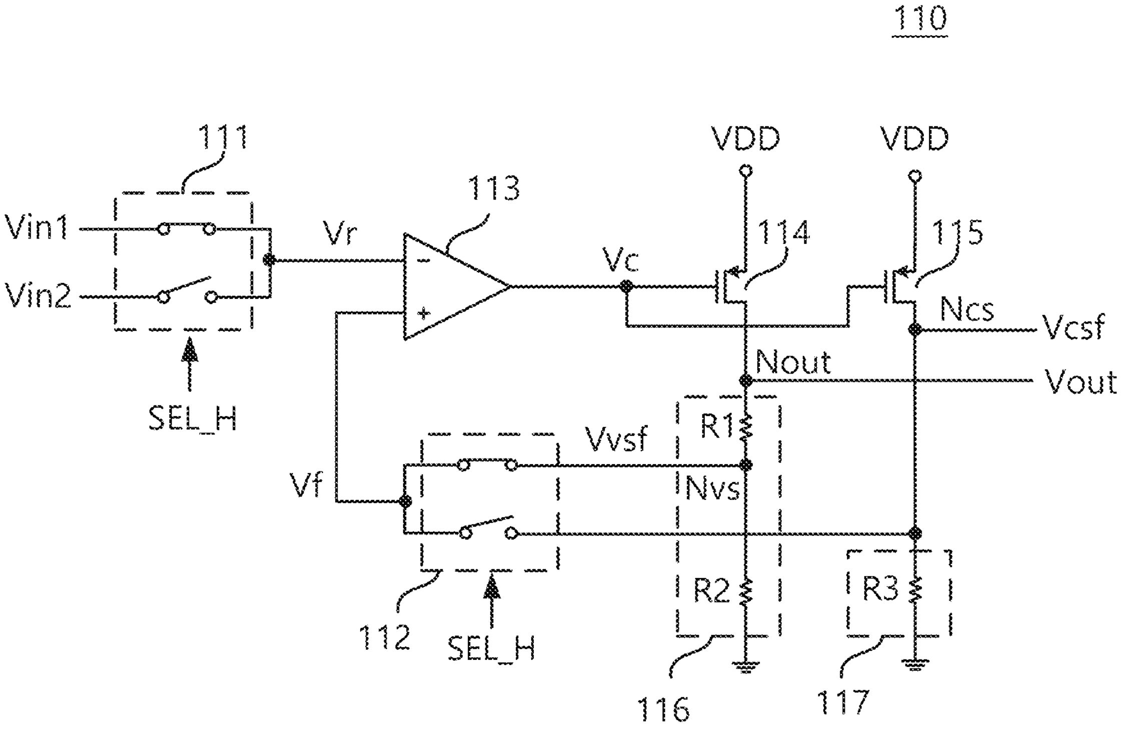
FIG. 3A is a diagram illustrating an example of a configuration and an operation of the linear regulator circuit of FIG. 2.

FIG. 3A is a diagram illustrating an example of a configuration and an operation of the linear regulator circuit 110 of FIG. 2. For example, FIG. 3A illustrates an example in which the linear regulator circuit 110 of FIG. 2 performs an operation to adjust a magnitude of an output voltage. To this end, in FIG. 3A, it is assumed that a selection control signal SEL is at a high level, for example, a first signal.

The first switching circuit 111 may receive a selection control signal SEL_H at a high level from the control circuit 200 (see FIG. 1). In this case, the first switching circuit 111 may provide a first input voltage Vin1, associated with a target voltage, to the voltage compensator 113 as a reference voltage Vr.

The second switching circuit 112 may receive a selection control signal SEL_H at a high level from the control circuit 200. In this case, the second switching circuit 112 may provide a voltage sensing feedback voltage Vvsf to a voltage compensator 113 as a feedback voltage Vf.

The voltage compensator 113 may generate an error voltage Vc based on an error between the reference voltage Vr and the feedback voltage Vf. In an example embodiment, the voltage compensator 113 may be implemented as an operational amplifier, as illustrated in FIG. 3. In this case, the reference voltage Vr provided by the first switching circuit 111 may be provided to an inverting input terminal of the voltage compensator 113, and the feedback voltage Vf provided by the second switching circuit 112 may be provided to a non-inverting input terminal. The voltage compensator 113 may amplify a difference between the reference voltage Vr, and may output a result of the amplification as an error voltage Vc. The error voltage Vc may be applied to gates of the first power transistor 114 and the second power transistor 115.

The error voltage Vc may be provided to the gate of the first power transistor 114. One end of the first power transistor 114 may be connected to a power supply voltage terminal VDD, and the other end thereof may be connected to an output node Nout on which the output voltage Vout is generated. Accordingly, the amount of current provided from the power supply voltage terminal VDD to the output node Nout may vary based on a level of the error voltage Vc, resulting in a change in an output voltage Vout on the output node Nout.

The error voltage Vc may be provided to the gate of the second power transistor 115. One end of the second power transistor 115 may be connected to a power supply voltage terminal VDD, and the other end thereof may be connected to a current sensing node Ncs. The gate of the second power transistor 115 may be connected to the gate of the first power transistor 114. Accordingly, the second power transistor 115 may mirror current, flowing through the first power transistor 114, to generate mirror current.

The mirroring current, generated by the second power transistor 115, may be equal to 1/M of current flowing through the first power transistor 114. In an example embodiment, M may be 1000, but example embodiments are not limited thereto. The mirroring current may be provided to the current sensing circuit 117.

The current sensing circuit 117 may be connected between the current sensing node Ncs and a ground terminal. The current sensing circuit 117 may include a resistor R3. The current sensing circuit 117 may generate a current sensing feedback voltage Vcsf based on a resistance value of the resistor R3 and a current value of the mirroring current.

The voltage sensing circuit 116 may be connected between the output node Nout and a ground terminal. In an example embodiment, the voltage sensing circuit 116 may be a voltage divider including a resistor R1 and a resistor R2, as illustrated in FIG. 3A. The resistor R1 may be disposed between the output node Nout and a voltage sensing node Nvs, and the resistor R2 may be disposed between the voltage sensing node Nvs and the ground terminal. The output voltage Vout may be divided based on resistance values of the resistor R1 and the resistor R2 to generate a voltage sensing feedback voltage Vvsf on the voltage sensing node Nvs.

As illustrated in FIG. 3A, when the selection control signal SEL is a first signal, the voltage compensator 113 may amplify a difference between a first input voltage Vin1, associated with a target voltage, and the voltage sensing feedback voltage Vvsf to generate an error voltage Vc. A degree to which the first power transistor 114 is turned on may be determined based on a level of the error voltage Vc.

The output voltage Vout may be fed back to the voltage compensator 113 through the voltage sensing feedback voltage Vvsf.

As described above, when the selection control signal SEL is the first signal, the linear regulator circuit 110 may operate as a linear regulator controlling the output voltage Vout. Accordingly, the linear regulator circuit 110 may be implemented to operate alone, or may operate as a main linear regulator among a plurality of linear regulator circuits.

In FIG. 3A, the error voltage Vc is illustrated as being directly applied to the gates of the first power transistor 114 and the second power transistor 115, but the present disclosure is not limited thereto. For example, an additional circuit component such as a buffer may be present between an output terminal of the voltage compensator 113 and the first power transistor 114. In this case, an output of the buffer may be connected to the gates of the first power transistor 114 and the second power transistor.

Figure 3B:
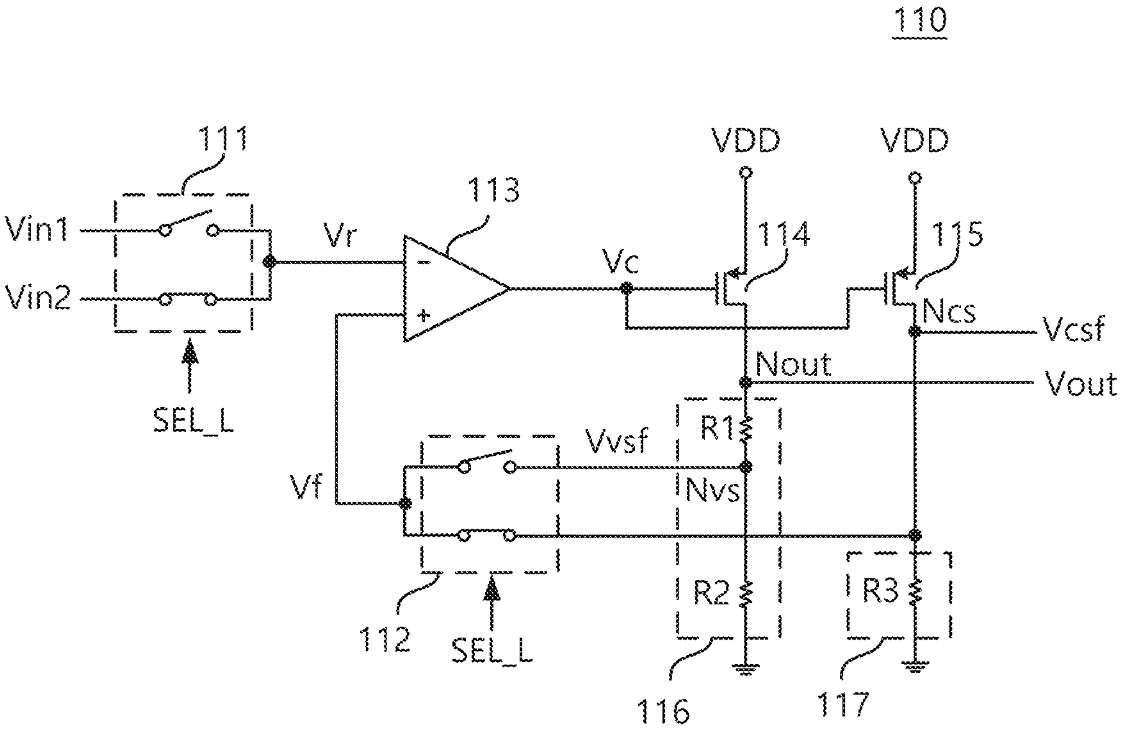
FIG. 3B is a diagram illustrating another example of an operation of the linear regulator circuit of FIG. 3A.

FIG. 3B is a diagram illustrating another example of the operation of the linear regulator circuit 110 of FIG. 3A. For example, FIG. 3B illustrates an example in which the linear regulator circuit 110 of FIG. 2 performs an operation to control a magnitude of output current. To this end, in FIG. 3B, it is assumed that a selection control signal SEL is a low-level signal, for example, a second signal.

Referring to FIG. 3B, the first switching circuit 111 may provide a second input voltage Vin2, associated with target current, to the voltage compensator 113 as a reference voltage Vr in response to a low-level selection control signal SEL_L and the second switching circuit 112 may provide a current sensing feedback voltage Vcsf to the voltage compensator 113 as a feedback voltage Vf.

Accordingly, the voltage compensator 113 may amplify a difference between the second input voltage Vin2, associated with the target current, and the current sensing feedback voltage Vcsf to generate an error voltage Vc.

A magnitude of output current provided to an output node Nout may be determined by an error voltage Vc1 provided to the gate of the first power transistor 114, and output current flowing through the first power transistor 114 may be mirrored by the second power transistor 115. Mirroring current may be fed back to the voltage compensator 113 through the current sensing feedback voltage Vcsf. As a result, the current flowing to the output node Nout and a current sensing node Ncs may be controlled by the second input voltage Vin2 associated with the target current.

As described above, when the selection control signal SEL is the second signal, the first linear regulator circuit 110 may operate as a linear regulator controlling the current on the output node Nout and the current sensing node Ncs.

As described above, the linear regulator circuit 110 may operate as a linear regulator controlling the output voltage Vout when the selection control signal SEL is the first signal, and may operate as a linear regulator controlling the current on the output node Nout and the current sensing node Ncs when the selection control signal SEL is the second signal.

Accordingly, the linear regulator circuit 110 according to an example embodiment may be implemented to operate alone, or a plurality of linear regulator circuits may be connected to operate together. For example, when a plurality of linear regulator circuits are implemented to be connected to each other, the selection control signal SEL_H, the first signal, may be applied to a main linear regulator circuit and the selection control signal SEL_L, the second signal, may be applied to a sub-linear regulator circuit. This will be described below in more detail in FIGS. 5 to 14.

Figure 4:
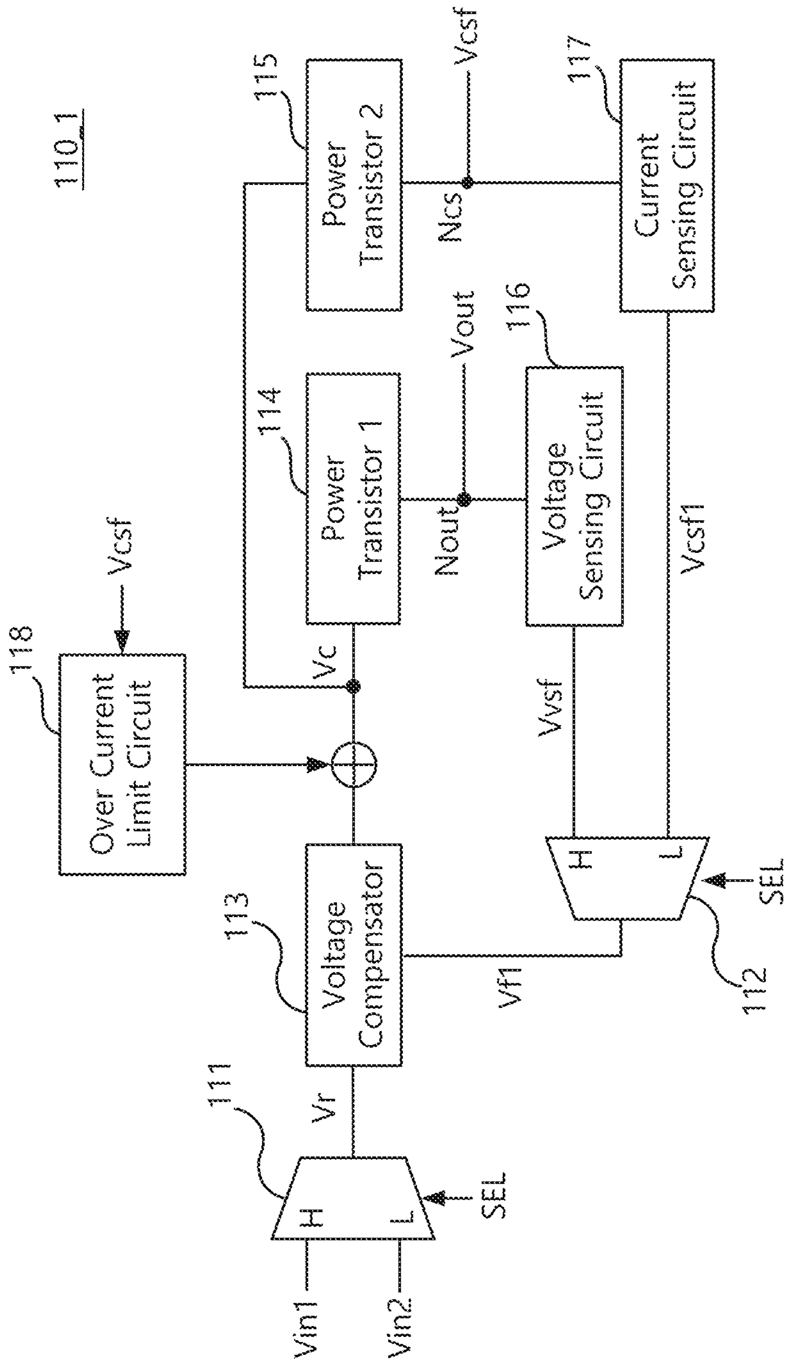
FIG. 4 is a diagram illustrating another example of a linear regulator circuit according to an example embodiment.

The linear regulator circuit 110 described in FIGS. 2 to 4 is merely an example, and the present disclosure is not limited thereto. According to example embodiments, the linear regulator circuit 110 may further include additional components. This will be described below in more detail in FIG. 4.

FIG. 4 is a diagram illustrating another example of a linear regulator circuit 110_1 according to an example embodiment. The linear regulator circuit 110_1 of FIG. 4 is similar to or the same as the linear regulator circuit 110 of FIGS. 2 to 3. Accordingly, the same or similar components are denoted by the same or similar reference numerals, and repetitive descriptions will be omitted below.

Referring to FIG. 4, a preregulator circuit 110_1 of FIG. 4 may further include an overcurrent limit circuit 118, as compared with FIG. 2.

When excessive current flows to a first power transistor 114, the overcurrent limit circuit 118 may adjust an error voltage Vc, applied to the first power transistor 114, to prevent or reduce overcurrent from flowing to the first power transistor 114. For example, when a current sensing feedback voltage Vcsf generated by a current sensing circuit 117 is higher than a threshold value, the overcurrent limit circuit 118 may determine that overcurrent has been generated in the first power transistor 114 and may adjust the error voltage Vc. Accordingly, the overcurrent may be prevented (or alternatively, reduced) from flowing to an output node Nout. Besides, a linear regulator circuit 110 according to an example embodiment may further include other additional components.

Figure 5:
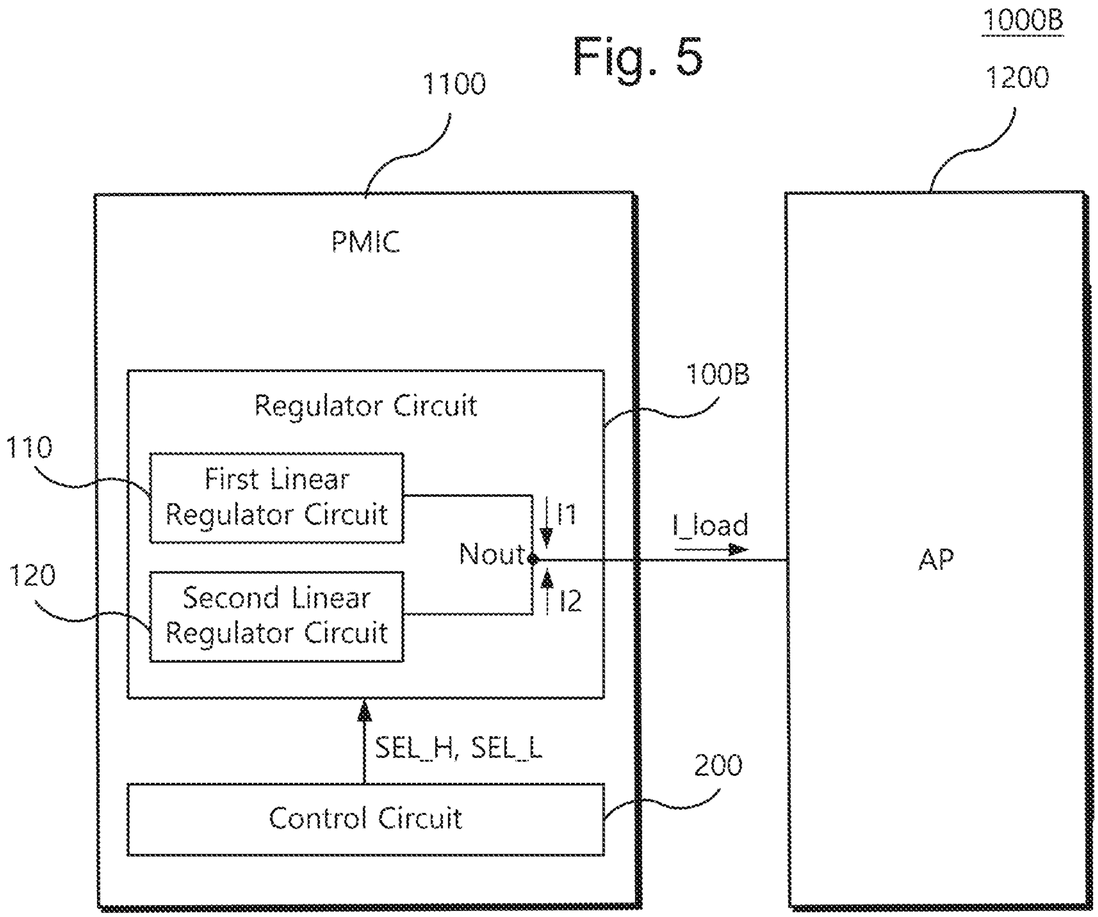
FIG. 5 is a block diagram illustrating a user device according to an example embodiment.

FIG. 5 is a block diagram illustrating a user device 1000B according to an example embodiment. Referring to FIG. 5, the user device 1000B may include a power management integrated circuit 1100 and an application processor 1200, and the regulator circuit 100B includes a first linear regulator circuit 110 and a second linear regulator circuit 120.

The first linear regulator circuit 110 and the second linear regulator circuit 120 may be connected to an output node Nout in parallel. Each (or alternatively, at least one) of the first linear regulator circuit 110A and the second linear regulator circuit 120A may receive a selection control signal SEL.

In an example embodiment, the first linear regulator circuit 110 may operate as a main linear regulator circuit. In this case, a selection control signal SEL_H at a high level may be applied to the first linear regulator circuit 110. The first linear regulator circuit 110 may control a voltage on the output node Nout based on a magnitude of a first reference voltage to provide first current I1 to the output node Nout. As described above, the first linear regulator 110 may perform a voltage regulation operation to control a voltage on the output node.

The second linear regulator circuit 120 may operate as a sub-linear regulator circuit. In this case, a selection control signal SEL_L at a low level may be applied to the second linear regulator circuit 120. The second linear regulator circuit 120 may provide second current I2 to the output node Nout and may control a magnitude of the second current I2 based on a magnitude of the first current I1. For example, the second linear regulator circuit 120 may control the magnitude of the second current I2 such that the magnitude of the second current I2 is the same as the magnitude of the first current I1. As described above, the second linear regulator circuit 120 may perform a current regulation operation to control the magnitude of the second current I2 based on the magnitude of the first current I1.

As described above, the regulator circuit 100B according to an example embodiment may generate the first current I1 through the first linear regulator circuit 110 and generate the second current I2 through the second linear regulator circuit 120, and may sum the first current I1 and the second current I2 to provide load current I_load to an application processor 1200. For example, the second linear regulator circuit 120 controls the magnitude of the second current I2 based on the magnitude of the first current I1, so that a balance resistor for controlling the magnitudes of the first current I1 and the second current I2 is not required. As a result, the regulator circuit 100B according to an example embodiment may prevent or reduce power loss caused by a balance resistor while satisfying condition of increased load current required (or alternatively, used) by the application processor 1200.

Figure 6:
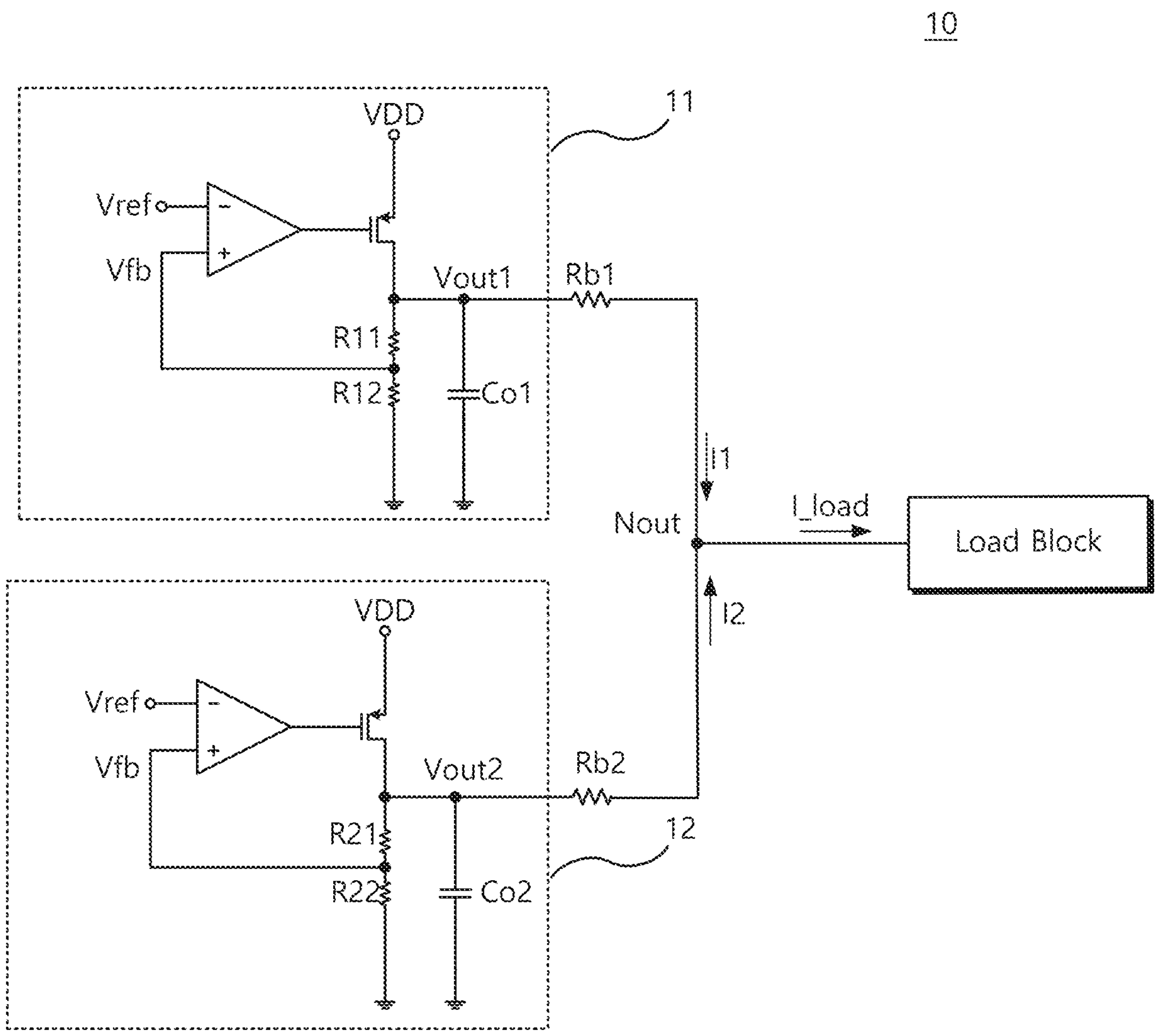
FIG. 6 is a diagram illustrating a regulator circuit including a parallel connection structure of a linear regulator according to the related art.

FIG. 6 is a diagram illustrating a regulator circuit 10 including a parallel connection structure of a linear regulator according to the related art.

Referring to FIG. 6, the regulator circuit 10 may include a first LDO 11 and a second LDO 12. The first LDO 11 may receive a feedback of a first output voltage Vout1 to control a first output voltage Vout1 based on a reference voltage Vref, and the second LDO 12 may receive a feedback of the second output voltage Vout2 to control a second output voltage Vout1 based on the reference voltage Vref. The first LDO 11 and the second LDO 12 may provide first current I1 and second current I2 to the output node Nout, respectively.

The regulator circuit 10 of FIG. 6 may include a first balance resistor Rb1 and a second balance resistor Rb2 to adjust magnitudes of the first current I1 and the second current I2. In this case, presence of resistances of the first balance resistor Rb1 and the second balance resistor Rb2 may result in power loss and voltage drop, and may result in less accuracy of the regulator circuit 10.

Meanwhile, the regulator circuit 100B of FIG. 5 does not use additional components such as the first balance resistor Rb1 and the second balance resistor Rb2. Accordingly, the regulator circuit 100B may accurately control a voltage on an output node and current provided to a load while preventing or reducing power loss.

Figure 7:
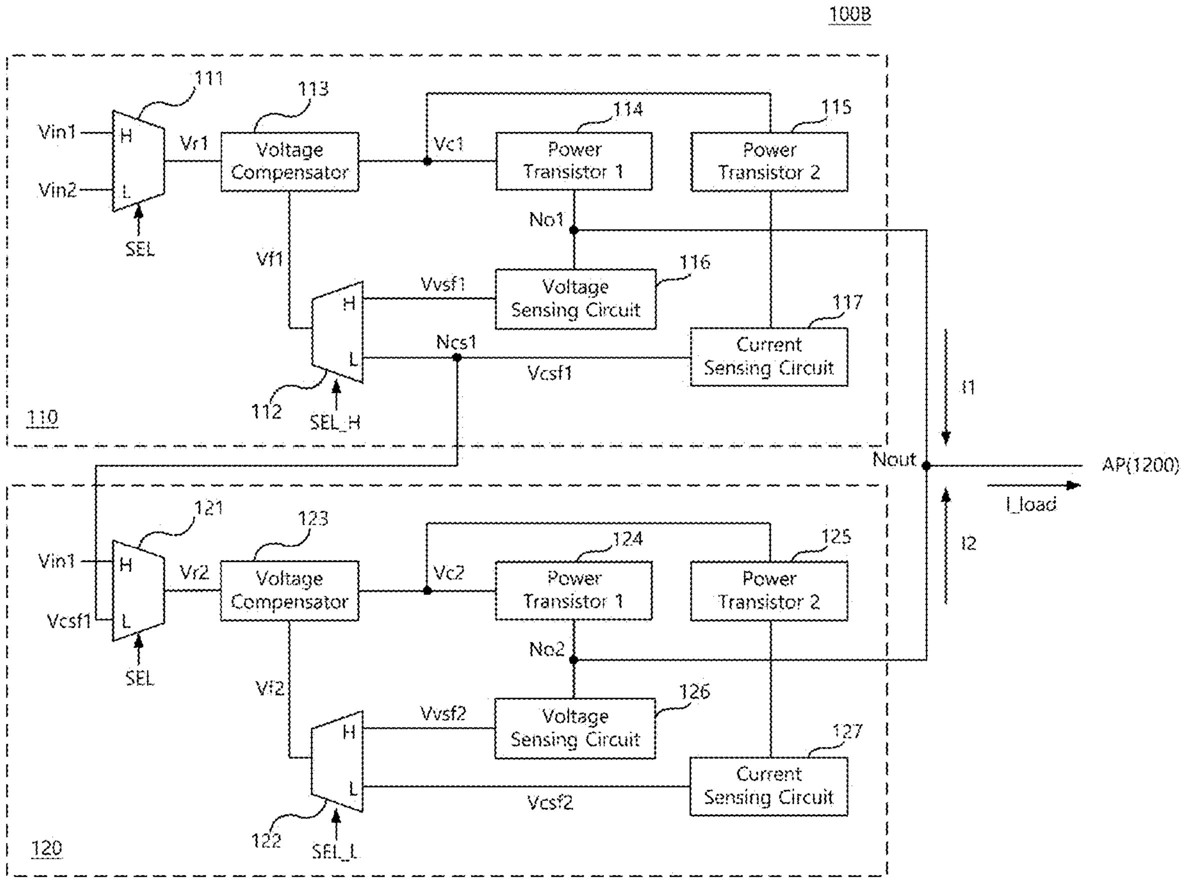
FIG. 7 is a diagram illustrating an example of the regulator circuit of FIG. 5 according to an example embodiment.

FIG. 7 is a diagram illustrating an example of the regulator circuit of FIG. 5 according to an example embodiment. Each (or alternatively, at least one) of a first regulator circuit 110 and a second regulator circuit 120 of FIG. 7 has a configuration the same as or similar to or the same as that of the regulator circuit 110 of FIG. 2. Therefore, the same or similar components are denoted by the same or similar reference numerals, and repeated descriptions will be omitted.

Referring to FIG. 7, the regulator circuit 100B may include the first regulator circuit 110 and the second regulator circuit 120. The first regulator circuit 110 may provide first current I1 to an output node Nout, and the second regulator circuit 120 may provide second current I2 to the output node Nout.

A selection control signal SEL_H at a high level may be applied to the first regulator circuit 110. In this case, a first switching circuit 111 may provide a first input voltage Vin1, associated with a target voltage, to a voltage compensator 113 as a first reference voltage Vr1. In addition, a second switching circuit 112 may provide a first voltage sensing feedback voltage Vfb1 to the voltage compensator 113 as a first feedback voltage Vf1.

The voltage compensator 113 may generate a first error voltage Vc1 based on a difference between the first input voltage Vin1, associated with the target voltage, and the first voltage sensing feedback voltage Vvsf1. The voltage compensator 113 may provide the first error voltage Vc1 to a first power transistor 114 and a second power transistor 115.

The first power transistor 114 may be connected between a power supply voltage terminal and the output node Nout to provide current from the power supply voltage terminal to the output node Nout.

The voltage sensing circuit 116 may generate a first voltage sensing feedback voltage Vvsf1 based on a voltage on the output node Nout. The first voltage sensing feedback voltage Vvsf1 may be provided to the second switching circuit 112.

The second power transistor 115 may mirror output current of the first transistor 114 to generate mirroring current. The mirroring current may be provided to the current sensing circuit 117.

The current sensing circuit 117 may generate the first current sensing feedback voltage Vcsf1 based on the mirroring current received from the second power transistor 116. In this case, the first current I1 is based on current flowing through the first power transistor 114 and the current flowing through the first power transistor 114 is reflected in the mirroring current, so that the first current sensing feedback voltage Vcsf1 may reflect a magnitude of the first current I1. As illustrated in FIG. 7, the first current sensing feedback voltage Vcsf1 may be provided as a voltage associated with target current of the second linear regulator circuit 120.

As described above, the first linear regulator circuit 110 may control the voltage on the output node Nout based on the first input voltage Vin1, associated with the target voltage, in response to the high-level selection control signal SEL_H. Also, the first linear regulator circuit 110 may generate a first current sensing feedback voltage Vcsf1 reflecting the magnitude of the first current I1 provided to the output node Nout.

Continuing refer to FIG. 7, unlike the first linear regulator 100 applied with the selection control signal SEL_H at a high level, the second regulator circuit 120 may be applied with (or alternatively, receive) a selection control signal SEL_L at a low level. Other than a difference in an applied selection control signal, components of both circuits may be configured in the same manner.

A third switching circuit 121 may receive the selection control signal SEL_L at a low level. The third switching circuit 121 may provide the first current sensing feedback voltage Vcsf1, generated by the first linear regulator circuit 110, to the voltage compensator 123 as a second reference voltage Vr2.

The fourth switching circuit 122 may receive the selection control signal SEL_L at a low level. The fourth switching circuit 122 may provide a second current sensing feedback voltage Vcsf2 to the voltage compensator 123 as a second feedback voltage Vf2.

The voltage compensator 123 may generate a second error voltage Vc2 based on a difference between the first current sensing feedback voltage Vcsf1 and the second current sensing feedback voltage Vcsf2. The second error voltage Vc2 may be provided to a third power transistor 124 and a fourth power transistor 125.

A voltage sensing circuit 126 may generate a second voltage sensing feedback voltage Vvsf2 in a manner, similar to or the same as the manner of the voltage sensing circuit 116, and a current sensing circuit 127 may generate a second current sensing feedback voltage Vcsf in a manner, similar to or the same as the manner of the current sensing circuit 117.

Similarly to the first current sensing feedback voltage Vcsf1, the second current sensing feedback voltage Vcsf2 may reflect a magnitude of the second current I2. In addition, a magnitude of current flowing to the third power transistor 124 and the fourth power transistor 125 may vary depending on the magnitude of the second error voltage Vc2 and a magnitude of the second current sensing feedback voltage Vcsf2, reflecting the varying magnitude of the current, may also vary. The second current sensing feedback voltage Vcsf2 may be fed back again to the voltage compensator 123. Accordingly, the second linear regulator circuit 120A may adjust the magnitude of the second current I2 depending on the magnitude of the first current I1.

As described above, the second linear regulator circuit 120 may adjust the magnitude of the second current I2, provided to the output node Nout, based on the first current sensing feedback voltage Vcsf1 received from the first linear regulator circuit 110.

As described above, the regulator circuit 100 according to an example embodiment may control a voltage on the output node Nout based on the first input voltage. In addition, the regulator circuit 100 controls the magnitude of the second current I2 based on the magnitude of the first current I1, so that an additional component, such as a balance resistor, for adjusting the magnitudes of the first current I1 and the second current I2 may not be required. For this reason, power loss may be prevented or reduced.

In addition, the regulator circuit 100 according to an example embodiment connects linear regulator circuits having the same circuit structure to each other in parallel and applies only the selection control signal SEL in a different manner, so that conditions of increased load current, required (or alternatively, used) by a load block, may be satisfied without a redesign.

Figure 8:
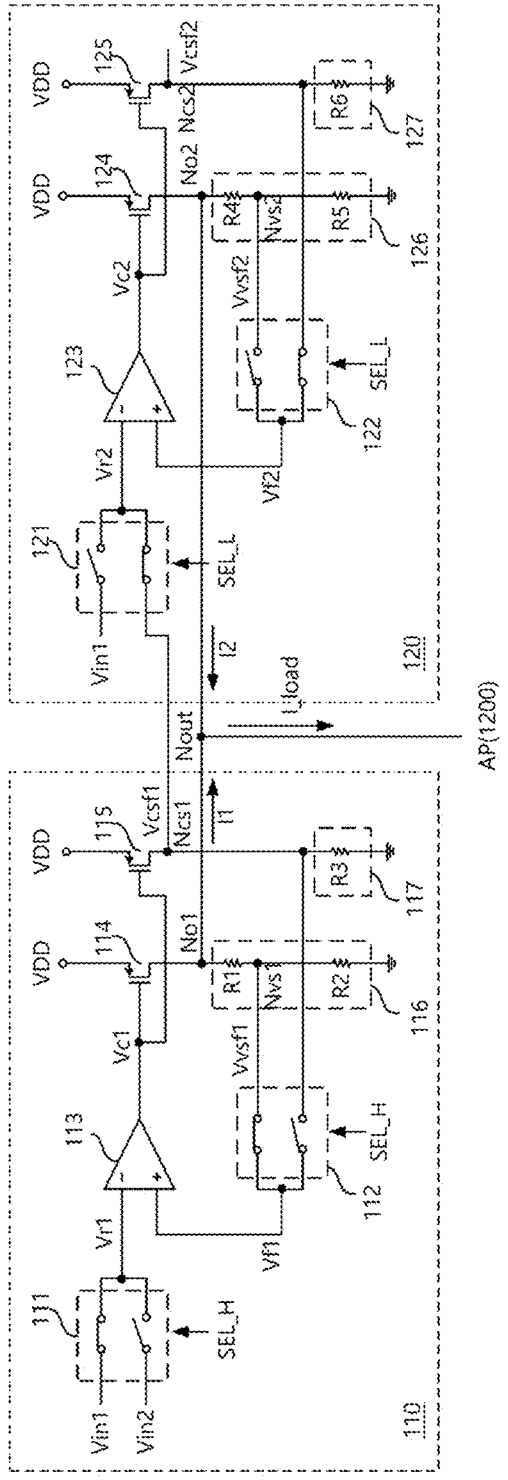
FIG. 8 is a diagram illustrating an example in which the regulator circuit of FIG. 7 is implemented.

FIG. 8 is a diagram illustrating an example in which the regulator circuit 100B of FIG. 7 is implemented. Each (or alternatively, at least one) of a first regulator circuit 110 and a second regulator circuit 120 of FIG. 8 has a configuration the same as or similar to or the same as that of the regulator circuit 110 of FIG. 3. Therefore, the same or similar components are denoted by the same or similar reference numerals, and repeated descriptions will be omitted.

Referring to FIG. 8, the regulator circuit 100B may include a first linear regulator circuit 110 and a second linear regulator circuit 120.

A voltage compensator 113 may be implemented as an operational amplifier, as illustrated in FIG. 3. A first input voltage Vin1, provided by a first switching circuit 111, may be provided to an inverting input terminal of the voltage compensator 113 and a first feedback voltage Vf1, provided by a second switching circuit 112, may be provided to a non-inverting input terminal of the voltage compensator 113.

The voltage compensator 113 may amplify a difference between the first input voltage Vin1 and the first feedback voltage Vf1, and may generate a result of the amplification as a first error voltage Vc1. The first error voltage Vc1 may be applied to gates of a first power transistor 114 and a second power transistor 115.

One end of the first power transistor 114 may be connected to a power supply voltage terminal VDD, and the other end thereof may be connected to the first output node No1. The first power transistor 114 may provide supply current from the power voltage terminal VDD to the first output node No1 based on a level of the first error voltage Vc1. As illustrated in FIG. 8, the first output node No1 and the output node Nout may be directly connected to each other, but one or more circuit elements may be disposed between therebetween according to example embodiments.

One end of the second power transistor 115 may be connected to a power supply voltage terminal VDD, and the other end thereof may be connected to a first current sensing node Ncs1. A gate of the second power transistor 115 may be connected to a gate of the first power transistor 114 to mirror current, flowing through the first power transistor 114, to generate mirroring current. The mirroring current may be equal to 1/M of the current flowing through the first power transistor 114.

A voltage sensing circuit 116 may be connected between the first output node No1 and a ground terminal. In an example embodiment, the voltage sensing circuit 116 may be a voltage divider including a resistor R1 and a resistor R2, as illustrated in FIG. 7. The resistor R1 may be disposed between the first output node No1 and a first voltage sensing node Nvs1, and the resistor R2 may be disposed between the first voltage sensing node Nvs1 and the ground terminal. An output voltage Vout may be divided depending on resistance values of the resistors R1 and R2 to generate a first voltage sensing feedback voltage Vvsf1 on a first voltage sensing node Nvs1.

The current sensing circuit 117 may be connected between a first current sensing node Ncs1 and the ground terminal. The first current sensing circuit 117 may include a resistor R3. The first current sensing circuit 117 may generate a first current sensing feedback voltage Vcsf1 based on a resistance value of the resistor R3 and a current value of the mirroring current.

A selection control signal SEL at a high level may be applied to the first linear regulator circuit 110. In this case, the first switching circuit 111 may provide a first input voltage Vin1, associated with a target voltage, to a voltage compensator 113 as a first reference voltage Vr1. In addition, the second switching circuit 112 may provide a first voltage sensing feedback voltage Vfb1 to the first voltage compensator 113 as a first feedback voltage Vf1.

When a voltage on the output node Nout is increased to increase a difference between the first input voltage Vin1, associated with the target voltage, and the first voltage sensing feedback voltage Vf1, the voltage compensator 113 may generate a higher first error voltage Vc1. Accordingly, current flowing to the first power transistor 114 may be increased and a voltage drop may occur, resulting in a decrease in the voltage on the output node Nout.

As described above, the first linear regulator circuit 110 may control the voltage on the output node Nout depending on the first input voltage Vin1 associated with the target voltage.

Continuing to refer to FIG. 8, the configuration of the second linear regulator circuit 120 may be substantially the same as the configuration of the first linear regulator circuit 110.

A third switching circuit 121 may provide the first current sensing feedback voltage Vcsf1, generated by the first linear regulator circuit 110, to the voltage compensator 123 as a second reference voltage Vr2 in response to a selection control signal SEL_L at a low level.

A fourth switching circuit 122 may provide the second current sensing feedback voltage Vcsf2 to the voltage compensator 123 as a second feedback voltage Vf2 in response to the selection control signal SEL_L at a low level.

The first current sensing feedback voltage Vcsf1 may be provided to an inverting input terminal of the voltage compensator 123, and the second current sensing feedback voltage Vcsf2 may be provided to a non-inverting input terminal of the voltage compensator 123. The voltage compensator 123 may generate a second error voltage Vc2 based on a difference between the first current sensing feedback voltage Vcsf1 and the second current sensing feedback voltage Vcsf2. The second error voltage Vc2 may be provided to the third power transistor 124 and the fourth power transistor 125.

A voltage sensing circuit 126 may generate a second voltage sensing feedback voltage Vvsf2 in a manner, similar to or the same as the manner of the voltage sensing circuit 116, and a current sensing circuit 127 may generate a second current sensing feedback voltage Vcsf2 in a manner, similar to or the same as the manner of the current sensing circuit 117.

Similarly to the first current sensing feedback voltage Vcsf1, the second current sensing feedback voltage Vcsf2 may reflect a magnitude of second current I2. In addition, a magnitude of current flowing through the first power transistor 124 and the second power transistor 125 may vary depending on a magnitude of the second error voltage Vc2 and a magnitude of the second current sensing feedback voltage Vcsf2, reflecting the varying the magnitude of the current, may also vary. The second current sensing feedback voltage Vcsf2 may be fed back again to the voltage compensator 123. As a result, the second linear regulator circuit 120 may adjust the magnitude of the second current I2 depending on the magnitude of the first current I1.

As described above, the second linear regulator circuit 120 may adjust the magnitude of the second current I2, provided to the output node Nout, depending on the first current sensing feedback voltage vcsf1 received from the first linear regulator circuit 110.

Figure 9:
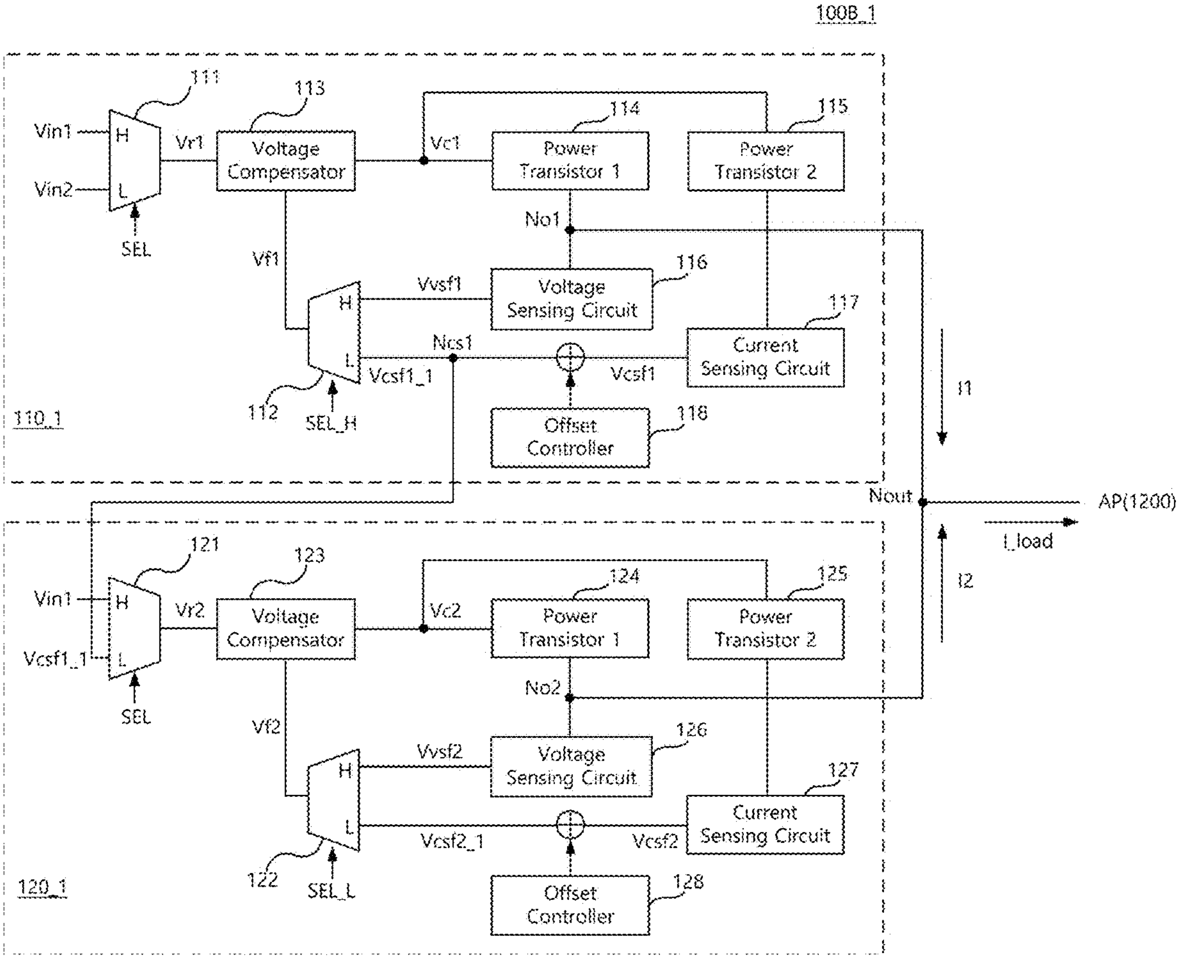
FIG. 9 is a diagram illustrating a regulator circuit according to an example embodiment.

FIG. 9 is a diagram illustrating a regulator circuit 100B_1 according to an example embodiment. The regulator circuit 100B_1 of FIG. 9 is similar to or the same as the regulator circuit 100B of FIG. 7. Therefore, the same or similar components are denoted by the same or similar reference numerals, and repetitive descriptions will be omitted below.

The regulator circuit 100B_1 of FIG. 9 may further include a first offset controller 118 and a second offset controller 128, unlike the regulator circuit 100B of FIG. 7.

The first offset controller 118 may generate a first offset voltage in the first current sensing feedback voltage Vcsf1, generated by the current sensing circuit 117, to generate a first current sensing feedback voltage Vcsf1_1 reflecting a first offset.

The second offset controller 128 may generate a second offset voltage in the second current sensing feedback voltage Vcsf2, generated by the current sensing circuit 127, to generate a second current sensing feedback voltage Vcsf2_1 reflecting a second offset.

A voltage compensator 113 and a voltage compensator 123 may be applied with (or alternatively, receive) a first feedback voltage Vf1, reflecting the first offset, and a second feedback voltage Vf2, reflecting the second offset, respectively. Accordingly, magnitudes of a first error voltage Vc1 and a second error voltage Vc2, respectively generated by the voltage compensator 113 and the voltage compensator 123, may vary. As a result, the magnitudes of first current I1 and the second current I2 may also vary.

In an example embodiment, the magnitude of the second offset voltage may be greater than the magnitude of the first offset voltage. In this case, the second current sensing feedback voltage Vcsf2_1, reflecting the second offset, may have a wider range of variation than the first current sensing feedback voltage Vcsf1_1 reflecting the first offset, and the magnitude of the second current I2 may be adjusted to be smaller than the magnitude of the first current I1. Accordingly, the voltage on the first output node No1 and the voltage on the second output node No2 may be more stably maintained.

As described above, the regulator circuit 100B_1 according to an example embodiment may generate increased load current required (or alternatively, used) by an application processor, or the like, without an additional external component such as a balance resistor, and may allow the voltage on the node Nout to be more stably maintained.

In FIG. 9, it has been described that the first linear regulator circuit 110 includes the first offset controller 118 and the second linear regulator circuit 120 includes the second offset controller 128. However, this is merely an example, and the present disclosure is not limited thereto. According to example embodiments, the first linear regulator circuit 110 may not include the first offset controller 118. Alternatively, according to example embodiments, the first linear regulator circuit 110 may include the first offset controller 118, but functions of the first offset controller 118 may not be activated. Even in this case, it will be appreciated by a person of ordinary skill in the art that the magnitude of the second offset is adjusted to adjust relative magnitudes of the first current I1 and the second current I2.

Figure 10:
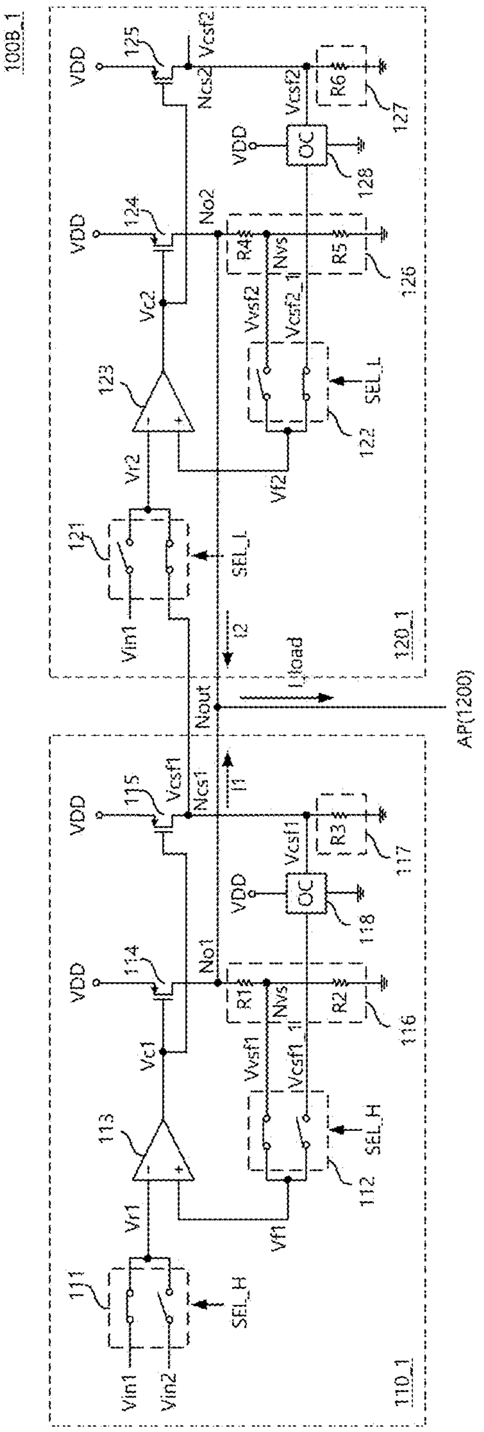
FIG. 10 is a diagram illustrating an example in which the regulator circuit of FIG. 9 is implemented.

FIG. 10 is a diagram illustrating an example in which the regulator circuit 100B_1 of FIG. 9 is implemented. The regulator circuit 100B_1 of FIG. 10 is similar to or the same as the regulator circuit 100B of FIG. 8. Therefore, the same or similar components are denoted by the same or similar reference numerals, and repetitive descriptions will be omitted below.

The regulator circuit 100B_1 of FIG. 10 may further include a first offset controller 118 and a second offset controller 129A, unlike the regulator circuit 100B of FIG. 8.

Referring to FIG. 10, the first offset controller 118 may be disposed between the current sensing circuit 117 and the second switching circuit 112. The first offset controller 118 may be applied with (or alternatively, receive) the first current sensing feedback voltage Vcsf1 and may generate a first current sensing feedback voltage Vcsf1_1 to which the first offset voltage is added. One end of the first offset controller 118 may be connected to a power supply voltage terminal VDD, and the other end thereof may be connected to a ground terminal.

The second offset controller 128 may be disposed between the current sensing circuit 127 and the second switching circuit 122. The second offset controller 128 may be applied with (or alternatively, receive) the second current sensing feedback voltage Vcsf2 and may generate a second current sensing feedback voltage Vcsf2_1 to which the second offset voltage is added. One end of the second offset controller 128 may be connected to a power supply voltage terminal VDD, and the other end thereof may be connected to a ground terminal.

In the case of the regulator circuit 100B which is not provided with the first offset controller 118 and the second offset controller 128, in a situation in which load current I_load is low, a voltage on a first output node No1 may be constantly maintained in a first linear regulator circuit 110 due to a voltage feedback loop, but a second error voltage Vc2 may vary in a second linear regulator circuit 120 due to an offset component of a second voltage compensator 123 itself, or the like, to cause leakage current to flow, resulting in an increase in a voltage on a second output node No2.

Meanwhile, in the regulator circuit 100B_1, the second offset controller 128 may set the second offset voltage to be higher than the first offset voltage and may feed the second current sensing feedback voltage Vcsf2_1, to which the second offset voltage is added, back to the second voltage compensator 123 such that second current I2 is lower than first current I1. Accordingly, the voltage on the output node Nout may be more stably maintained even when the load current I_load is low.

Figure 11A:
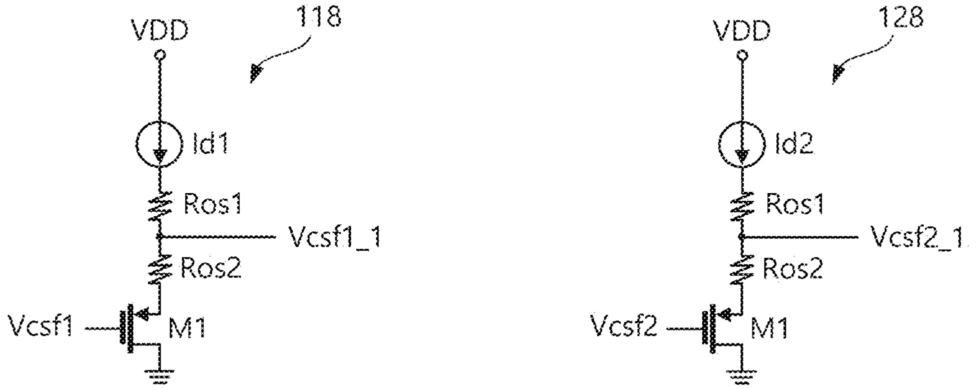
FIGS. 11A and 11B are diagrams, each illustrating an example in which an offset controller is implemented.
Figure 11B:
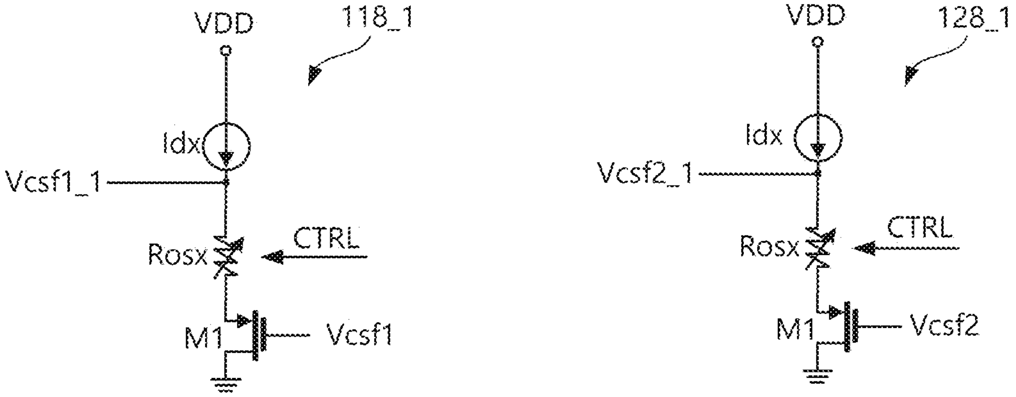

FIGS. 11A and 11B are diagrams, each illustrating an example in which an offset controller is implemented.

Referring to FIG. 11A, a first offset controller 118 may include a transistor M1, a resistor Ros1, a resistor Ros2, and a current source Id1. In this case, a magnitude of a first offset voltage may be determined based on a magnitude of current of the current source Id1 and a resistance value of the resistor Ros1.

A second offset controller 128 may include a transistor M1, a resistor Ros1, a resistor Ros2, and a current source Id2. In this case, a magnitude of a second offset voltage may be determined based on a magnitude of current of the current source Id1 and resistance values of the resistors Ros1 and Ros2.

As illustrated in FIG. 10A, the first offset controller 118 and the second offset controller 128 may generate different offset voltages. Accordingly, the magnitudes of the output current I1 of the first linear regulator circuit 110 and the output current I2 of the second linear regulator circuit 110 may be adjusted.

Referring to FIG. 11B, each (or alternatively, at least one) of a first offset controller 118_1 and a second offset controller 128_1 may include a transistor M1, a variable resistor Rosx, and a variable current source Idx. The variable resistor Rosx and the variable current source Idx may have a resistance value and a current value, variable depending on a control signal CTRL, respectively.

As illustrated in FIG. 11B, the first offset controller 118_1 and the second offset controller 128_1 provide different offset voltages allowing a voltage on an output node Nout of the regulator circuit 100B to be stably maintained.

Figure 12A:
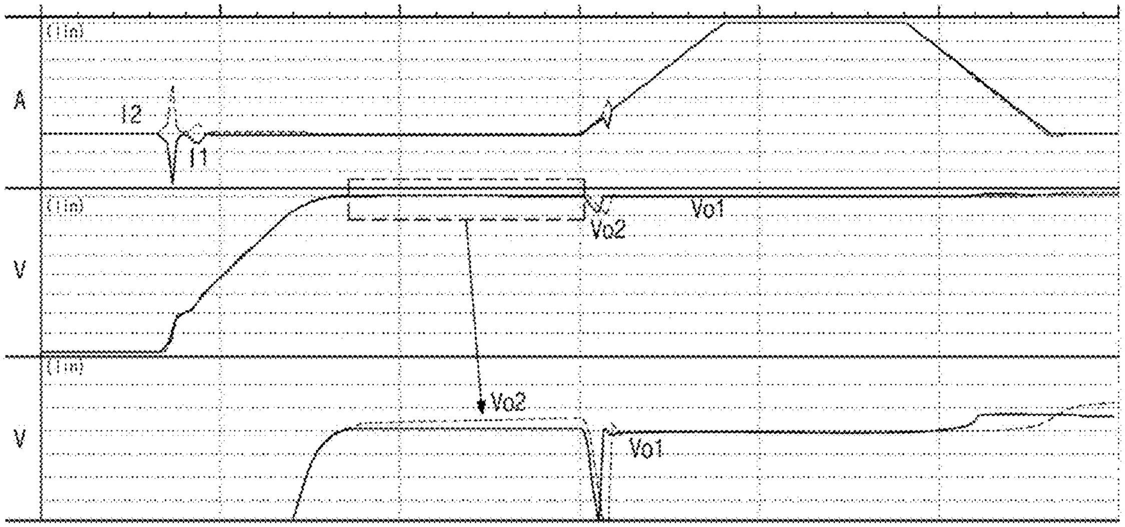
FIG. 12A is a diagram illustrating an output waveform when an offset controller is absent.
Figure 12B:
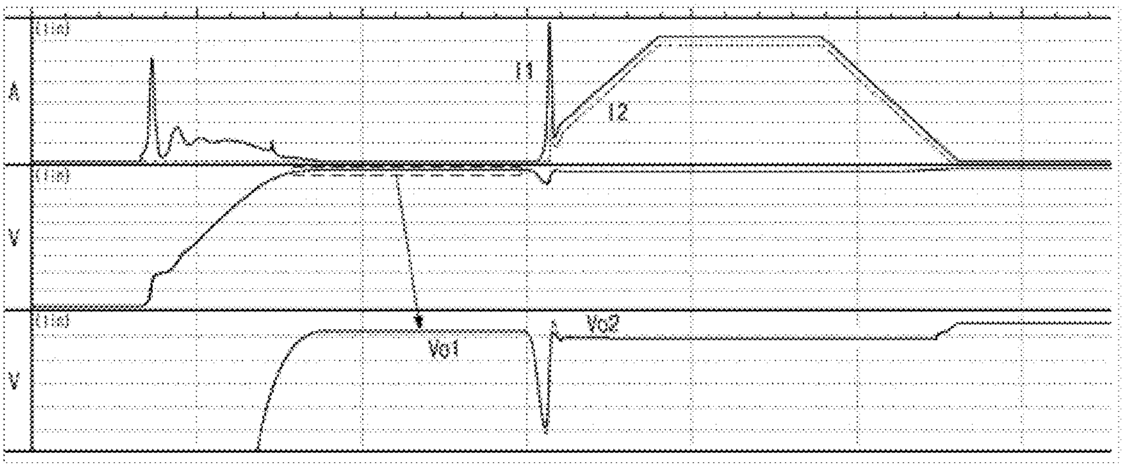
FIG. 12B is a diagram illustrating an output waveform when an offset controller is included.

FIG. 12A is a diagram illustrating an output waveform when an offset controller is absent, and FIG. 12B is a diagram illustrating an output waveform when an offset controller is included.

Referring to FIGS. 8 and 12A, Vo1 is a voltage on the first output node No1 of FIG. 7, and Vo2 is a voltage on the second output node No2 of FIG. 7. In addition, I1 is output current of the first linear regulator 110A, and I2 is output current of the second linear regulator 110B.

Referring to FIGS. 10 and 12B, Vo1 is a voltage on the first output node No1 of FIG. 7, and Vo2 is a voltage on the second output node No2 of FIG. 7. In addition, I1 is output current of the first linear regulator 110B, and I2 is output current of the second linear regulator 120B.

Referring to FIGS. 12A and 12B, in the absence of an offset controller, the voltage on the second output node No2 may be increased in the case in which the load current I_load has a magnitude close to zero (0). On the other hand, when a magnitude of the second current I2 is adjusted to be smaller than a magnitude of the first current I1 through the offset controller, both the voltages on the first output node No1 and the second output node No2 may be stably controlled even in the case in which the load current I_load has a magnitude close to zero (0).

Figure 13:
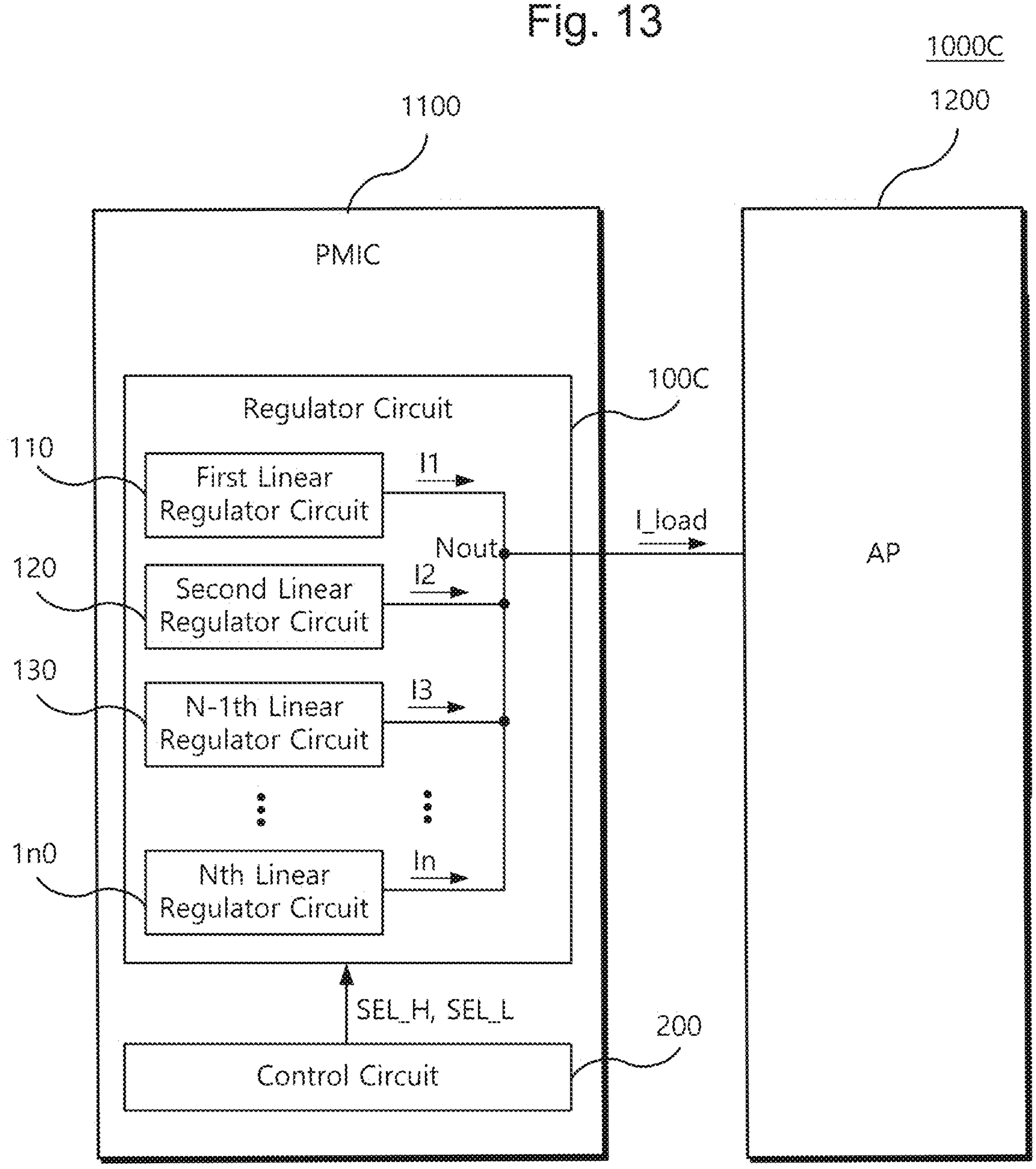
FIG. 13 is a block diagram illustrating a user device according to an example embodiment.

FIG. 13 is a block diagram illustrating a user device 1000C according to an example embodiment. A configuration and an operation of the regulator circuit 100C to be described in FIG. 13 are similar to or the same as those of the regulator circuit 100B of FIGS. 7 and 8. Therefore, repetitive descriptions will be omitted for brevity of description.

Referring to FIG. 13, the user device 1000C may include a power management integrated circuit 1100 and an application processor 1200, and the regulator circuit 100C may include first to n-th linear regulator circuits 110 to **1*n*0**.

The regulator circuit 100B of FIGS. 7 and 8 is illustrated as including two linear regulator circuits connected to each other in parallel, while the regulator circuit 100C of FIG. 13 is illustrated as including three or more linear regulator circuits connected to each other in parallel.

Referring to FIG. 13, the regulator circuit 100C may include a first linear regulator circuit 110 to an n-th linear regulator circuit **1*n*0. The first linear regulator circuit 110 to the n-th linear regulator 1*n*0** may be connected to an output node Nout in parallel and may provide first current I1 to n-th current In to the output node Nout, respectively. The first current I1 to the n-th current In may be added on the output node Nout to be provided to an application processor, or the like, as load current I_load.

Each (or alternatively, at least one) of the first linear regulator circuit 110 to the n-th linear regulator circuit **1*n*0 may operate based on a selection control signal SEL in a manner, similar to or the same as the first linear regulator circuit 110 or the second linear regulator circuit 120 of FIG. 7. In an example embodiment, the operation of the first linear regulator circuit 110 is similar to or the same as the operation of the first linear regulator circuit 110 of FIG. 7, and the operation of each (or alternatively, at least one) of the second linear regulator 120 to the n-th linear regulator 1*n*0 may be similar to or the same as the operation of the second linear regulator circuit 120 of FIG. 7. For example, the first linear regulator circuit 110 may operate as a main linear regulator circuit, and the second linear regulator 120 to the n-th linear regulator 1*n*0** may operate as sub-linear regulator circuits.

In an example embodiment, the first linear regulator circuit 110 may control the voltage on the output node Nout based on a first input voltage. For example, the first linear regulator circuit 110 may select a first input voltage associated with a target voltage, among a plurality of input voltages, as a first reference voltage in response to the selection control signal SEL, and may control the voltage on the output node Nout such that the voltage on the output node Nout corresponds to the first reference voltage.

In an example embodiment, the second linear regulator circuit 120_2 to the n-th linear regulator circuit **1*n*0 may control second current I2 to n-th current In based on a magnitude of first current, respectively. For example, the second linear regulator circuit 120 to the n-th linear regulator circuit 1*n*0 may select second to n-th input voltages based on the magnitude of the first current, among a plurality of input voltages, in response to the selection control signal SEL, respectively. The second linear regulator circuit 120 to the n-th linear regulator circuit 1*n*0** may control the second current I2 to the n-th current In such that the second current I2 to the n-th current In have magnitudes corresponding to the second to n-th input voltages, respectively.

As described above, the regulator circuit 100C according to an example embodiment may more flexibly respond to a requirement (or alternatively, a request, or indication) for increased load current of an application processor, or the like, and may control output current of each linear regulator circuit without an additional balance resistor to prevent or reduce power loss.

Figure 14A:
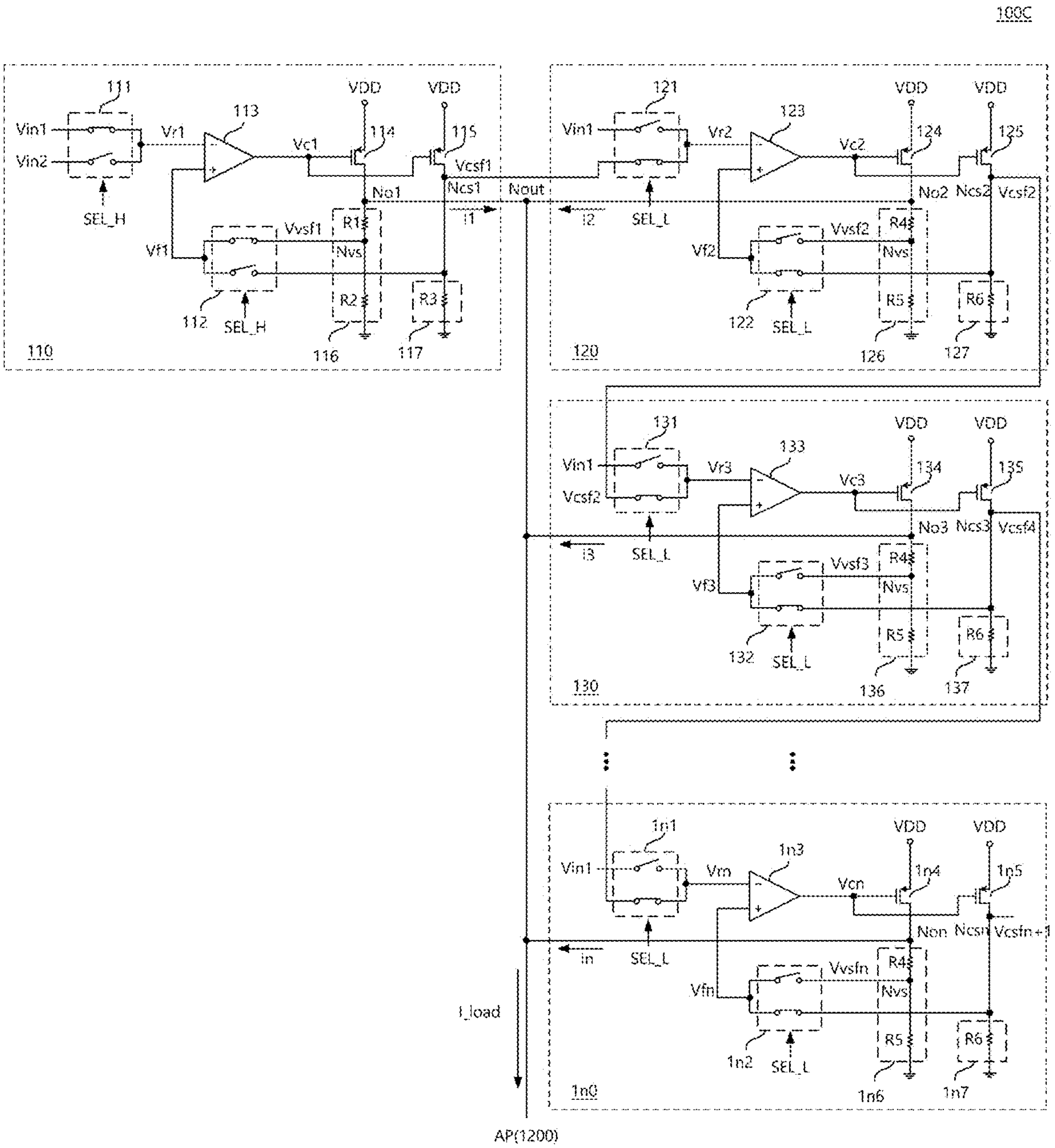
FIGS. 14A and 14B are diagrams, each illustrating an example in which a regulator circuit of FIG. 13 is implemented.
Figure 14B:
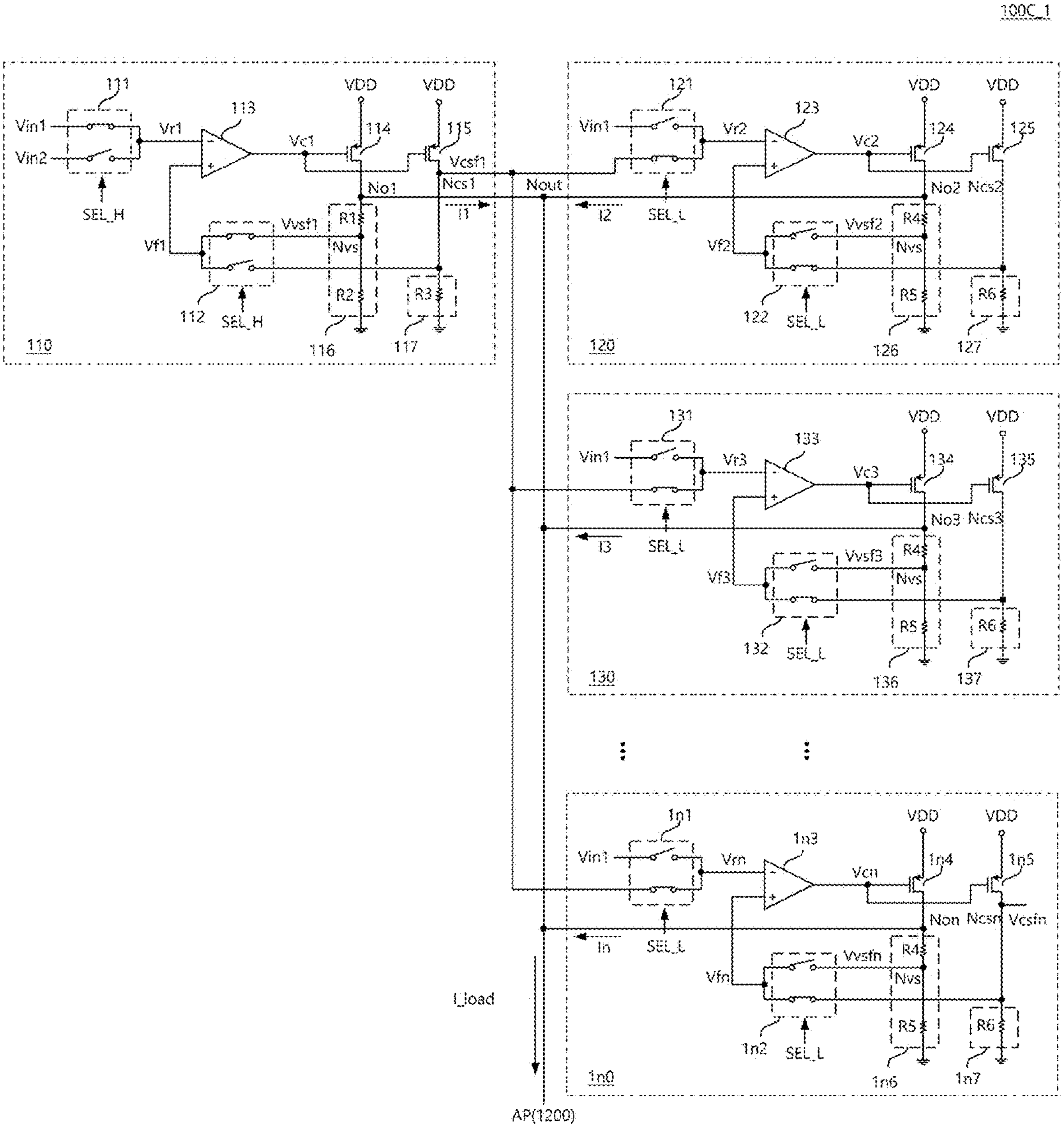

FIGS. 14A and 14B are diagrams, each illustrating an example in which the regulator circuit 100C of FIG. 13 is implemented.

An operation of a first linear regulator circuit 110 of FIGS. 14A and 14B is similar to or the same as the operation of the first linear regulator circuit 110 of FIG. 8, and an operation of each (or alternatively, at least one) of a second linear regulator circuit 120 to an n-th linear regulator circuit **1*n*0 is similar to or the same as the operation of the second linear regulator circuit 120 of FIG. 8**. Therefore, repetitive descriptions will be omitted below for brevity of description.

Referring to FIG. 14A, a second linear regulator circuit 120 may control a magnitude of second current I2 based on a first current sensing feedback voltage Vcsf1 based on a magnitude of first current I1. To this end, a second linear regulator circuit 120 includes a voltage compensator 123 generating a first error voltage based on a difference between the first current sensing feedback voltage Vcsf1 and a second current sensing feedback voltage Vcsf2. In an example embodiment, the voltage compensator 123 may amplify the difference between the first current sensing feedback voltage Vcsf1 and the second current sensing feedback voltage Vcsf2 to generate a second error voltage Vc2.

A third linear regulator circuit 130 may control a magnitude of the third current I3 based on the second current sensing feedback voltage Vcsf2 based on the magnitude of the second current I2. The third linear regulator circuit 130 may include a voltage compensator 133 generating a third error voltage Vc3 based on a difference between the second current sensing feedback voltage Vcsf2 and a third current sensing feedback voltage Vcsf3.

Similarly, an n-th linear regulator circuit **1*n*0 may generate n-th current In based on an n−1-th current sensing feedback voltage Vcsfn−1 based on a magnitude of n−1-th current. The n-th linear regulator circuit 1*n*0 may include a voltage compensator 1*n*2** generating an error voltage based on a difference between an n−1-th current sensing feedback voltage Vcsfn−1 and an n-th current sensing feedback voltage Vcsfn based on a magnitude of the n-th current In.

Although not illustrated, the first linear regulator circuit 110 to the n-th linear regulator **1*n*0** may further include a first offset controller to an n-th offset controller, respectively.

In an example embodiment, the second offset controller may reflect a second offset in the second current sensing feedback voltage Vcsf2 such that the magnitude of the first current I1 is greater than the magnitude of the second current I2, and may generate a second current sensing feedback voltage Vcsf2_1 in which the second offset is reflected. The second current sensing feedback voltage Vcsf2_1, in which the second offset is reflected, may be fed back to the voltage compensator 123.

Similarly, the n-th offset controller may generate an n-th offset voltage in an n-th current sensing feedback voltage Vcsfn and may generate an n-th current sensing feedback voltage Vcsfn_1 in which an n-th offset is reflected. In an example embodiment, a magnitude of the n-th offset voltage may be set to be greater than a magnitude of an n−1-th offset voltage such that n−1-th current is higher than the n-th current.

As described above, in the example of FIG. 14A, the n-th linear regulation circuit **1*n*0** may drive a current feedback loop using an input voltage based on a magnitude of the n−1-th current, output current of the n−1-th linear regulator circuit in a previous stage. In addition, a voltage, in which the n-th offset voltage is reflected, may be fed back to the current feedback loop such that the n−1-th current is higher than the n-th current.

Referring to FIG. 14B, a second linear regulator circuit 120 may determine a magnitude of second current I2 based on a first current sensing feedback voltage Vcsf1 based on a magnitude of first current I1. To this end, the second linear regulator circuit 120 may include a voltage compensator 123 generating a first error voltage based on a difference between the first current sensing feedback voltage Vcsf1 and a second current sensing feedback voltage Vcsf2.

Similarly, an n-th linear regulator circuit **1*n*0 may control a magnitude of n-th current In based on the first current sensing feedback voltage Vcsf1 based on the magnitude of the first current I1. To this end, the n-th linear regulator circuit 1*n*0 may include a voltage compensator 1*n*3 generating an n-th error voltage based on a difference between the first current sensing feedback voltage Vcsf1** and an n-th current sensing feedback voltage Vcsfn.

Although not illustrated, the first linear regulator circuit 110 to the n-th linear regulator **1*n*0** may further include a first offset controller to an n-th offset controller, respectively.

In this case, the second offset controller may reflect a second offset in a second current sensing feedback voltage Vcsf2 such that the magnitude of the first current I1 is greater than a magnitude of second current I2, and may generate a second current sensing feedback voltage Vcsf2_1 in which the second offset is reflected. The second current sensing feedback voltage Vcsf2_1, in which the second offset is reflected, may be fed back to a voltage compensator 123_2.

The n-th offset controller may generate an n-th offset voltage in the n-th current sensing feedback voltage Vcsfn and may generate an n-th current sensing feedback voltage Vcsfn_1 in which an n-th offset is reflected.

In the example of FIG. 14A, a magnitude of the n-th offset voltage may be set to be greater than a magnitude of an n−1-th offset voltage such that n−1-th current In−1 is greater than n-th current In. On the other hand, in the example of FIG. 4B, the first current In only needs to be higher than the second current I2 to the n-th current In and has not relation to a current magnitude between the second current I2 to the n-th current In, so that the second offset voltage to the n-th offset voltage may be set to be the same or different from each other.

As described above, in the example of FIG. 14B, all of the second linear regulator circuit 120 to the n-th linear regulator circuit **1*n*0 may drive a current feedback loop by selecting the first current sensing feedback voltage Vcsf1, in which the magnitude of the first current I1 is sensed, as a reference voltage. In addition, all of the second linear regulator circuit 120 to the n-th linear regulator circuit 1*n*0 may feed a feedback voltage, in which an offset is reflected, back to a feedback loop such that the first current I1 is higher than the second current I2** to the n-th current In.

As described above, the linear regulator circuit 100C according to an example embodiment may control a magnitude of output current of each linear regulator without power loss while satisfying requirements for increased load current by connecting n linear regulators to each other in parallel without redesigning a system. In addition, the linear regulator circuit 100C may allow a voltage on an output node to be more stably maintained even in a situation in which there is little load current through an offset controller.

As set forth above, according to example embodiments, a regulator circuit may reduce power loss while satisfying requirements of increased output current.

Any of the elements and/or functional blocks disclosed above may include or be implemented in processing circuitry such as hardware including logic circuits; a hardware/ software combination such as a processor executing software; or a combination thereof. For example, control circuit 200 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While example embodiments have been shown and described above, it will be apparent to those skilled in the art that modifications and variations could be made without departing from the scope of the present inventive concepts as defined by the appended claims.

What is claimed is:

1. A regulator circuit comprising:

a first linear regulator circuit configured to control a voltage on an output node based on a first reference voltage and to provide a first current to the output node, the first linear regulator circuit including a first voltage compensator configured to generate a first error voltage based on a difference between the first reference voltage and a first feedback voltage, the first feedback voltage provided to the first voltage compensator being a selected one of a first voltage sensing feedback voltage or a first current sensing feedback voltage based on a selection control signal; and a second linear regulator circuit connected in parallel to the first linear regulator circuit and configured to provide a second current to the output node, wherein the second linear regulator circuit is further configured to control a magnitude of the second current based on a magnitude of the first current.

2. The regulator circuit of claim 1, wherein the second linear regulator circuit comprises an offset controller configured to generate an offset voltage in a second current sensing feedback voltage, in which the magnitude of the second current is sensed such that the magnitude of the second current is greater than the magnitude of the first current, and the second linear regulator circuit is configured to control the magnitude of the second current based on the second current sensing feedback voltage and the first current sensing feedback voltage, the second current sensing feedback voltage reflecting the offset voltage, the first current sensing feedback voltage reflecting the magnitude of the first current.

3. The regulator circuit of claim 2, wherein the offset controller comprises a current source, at least one resistor, and at least one transistor, the second current sensing feedback voltage is applied to a gate of the at least one transistor, and the offset voltage is adjusted by a magnitude of current of the current source and a resistance value of the at least one resistor.

4. The regulator circuit of claim 1, wherein the first linear regulator circuit further comprises:

a first switching circuit configured to select one of a plurality of input voltages in response to the selection control signal and to provide the first reference voltage to the first voltage compensator; and a second switching circuit configured to provide one of the first voltage sensing feedback voltage and the first current sensing feedback voltage based on the magnitude of the first current as the first feedback voltage in response to the selection control signal, the voltage sensing feedback voltage being a division of a voltage on the output node.

5. The regulator circuit of claim 4, wherein the first linear regulator circuit further comprises:

a voltage divider connected between the output node and a ground terminal and configured to generate the voltage sensing feedback voltage;

a first power transistor connected between a power supply voltage terminal and the output node and configured to receive the first error voltage;

a second power transistor connected between the power supply voltage terminal and a first current sensing node and configured to transmit current generated by mirroring the first current to the first current sensing node; and a current sensing circuit connected between the first current sensing node and the ground terminal and configured to generate the first current sensing feedback voltage based on the current generated by mirroring the first current.

6. The regulator circuit of claim 5, wherein the second linear regulator circuit comprises:

a second voltage compensator configured to generate a second error voltage based on a difference between a second reference voltage and a second feedback voltage;

a third switching circuit configured to provide the first current sensing feedback voltage to the second voltage compensator as the second reference voltage in response to the selection control signal; and a fourth switching circuit configured to provide a second current sensing feedback voltage based on the magnitude of the second current to the second voltage compensator as the second feedback voltage in response to the selection control signal.

7. The regulator circuit of claim 6, wherein the second linear regulator circuit further comprises:

a third power transistor connected to the power supply voltage terminal and configured to receive the second error voltage;

a fourth power transistor connected between the power supply voltage terminal and a second current sensing node and configured to output current generated by mirroring the second current to the second current sensing node; and a second current sensing circuit connected between the second current sensing node and the ground terminal and configured to generate the second current sensing feedback voltage based on the current generated by mirroring the second current.

8. The regulator circuit of claim 7, wherein the second linear regulator circuit further comprises an offset controller configured to receive the second current sensing feedback voltage from one end connected to the second current sensing circuit to generate an offset voltage in the second current sensing feedback voltage, and to provide the second current sensing feedback voltage to the second switching circuit through the other end, the second current sensing feedback voltage reflecting the offset voltage, and the offset controller is further configured to generate the offset voltage such that the first current is higher than the second current by a first value.

9. The regulator circuit of claim 8, wherein the offset controller comprises a current source connected between the power supply voltage terminal and the other end, at least one resistor connected between the other end and at least one transistor; and the at least one transistor connected between the at least one resistor and the ground terminal, and the second current sensing feedback voltage is applied to a gate of the at least one transistor through the one end.

10. A regulator circuit comprising:

a first linear regulator circuit to an n-th linear regulator circuit, n being an integer greater than or equal to 3, wherein a n−1-th linear regulator circuit comprises a n−1-th voltage compensator configured to generate a first error voltage based on at least an n−1-th current sensing feedback voltage, the n−1-th current sensing feedback voltage being based on a magnitude of the n−1-th current, the n-th linear regulator circuit comprises an n-th voltage compensator configured to generate a second error voltage based on at least an n-th current sensing feedback voltage, the n-th current sensing feedback voltage being based on a magnitude of the n-th current, the first linear regulator circuit to the n-th linear regulator circuit are connected to an output node in parallel and respectively provide a first current to n-th current to the output node, the first linear regulator circuit is configured to control a voltage on the output node based on a first reference voltage, and a second linear regulator circuit to the n-th linear regulator circuit are configured to control magnitudes of a second current to the n-th current based on a magnitude of the first current.

11. The regulator circuit of claim 10, wherein the n−1-th voltage compensator is configured to generate the first error voltage based on a difference between a n−2-th current sensing feedback voltage based on a magnitude of the n−2-th current and the n−1-th current sensing feedback voltage, and the n-th voltage compensator is configured to generate the second error voltage based on a difference between the n−1-th current sensing feedback voltage and the n-th current sensing feedback voltage.

12. The regulator circuit of claim 11, wherein the second linear regulator circuit to the n-th linear regulator circuit comprise a second offset controller to an n-th offset controller, respectively, a n−1-th offset controller is configured to generate an n−1-th offset voltage in the n−1-th current sensing feedback voltage such that the magnitude of the n−2-th current is higher than the magnitude of the n−1-th current, the n-th offset controller is configured to generate an n-th offset voltage in the n-th current sensing feedback voltage such that the magnitude of the n−1-th current is higher than the magnitude of the n-th current, the n−1-th current sensing feedback voltage is fed back to the n−1-th voltage compensator, and the n-th current sensing feedback voltage is fed back to the n-th voltage compensator, the n−1-th current sensing feedback voltage reflecting the n−1-th offset voltage, and the n-th current sensing feedback voltage reflecting the n-th offset voltage, and a magnitude of the n-th offset volage is greater than a magnitude of the n−1-th offset voltage.

13. The regulator circuit of claim 12, wherein each of the second offset controller to the n-th offset controller comprises a variable current source and at least one resistor, and an offset voltage, generated by the second offset controller to the n-th offset controller, is adjusted by a magnitude of current of the variable current source and a resistance value of the at least one resistor.

14. The regulator circuit of claim 10, wherein the n−1-th voltage compensator is configured to generate the first error voltage based on a difference between a first current sensing feedback voltage based on the magnitude of the first current and the n−1-th current sensing feedback voltage, and the n-th volage compensator is configured to generate the second error voltage based on a difference between the first current sensing feedback voltage and the n-th current sensing feedback voltage.

15. The regulator circuit of claim 14, wherein the second linear regulator circuit to the n-th linear regulator circuit comprise a second offset controller to an n-th offset controller, respectively, a n−1-th offset controller is configured to generate an n−1-th offset voltage in the n−1-th current sensing feedback voltage such that the magnitude of the first current is greater than the magnitude of the n−1-th current, the n-th offset controller is configured to generate an n-th offset voltage in the n-th current sensing feedback voltage such that the magnitude of the first current is greater than the magnitude of the n-th current, and the n−1-th current sensing feedback voltage is fed back to the n−1-th voltage compensator, and the n-th current sensing feedback voltage is fed back to the n-th voltage compensator, the n−1-th current sensing feedback voltage reflecting the n−1-th offset voltage, and the n-th current sensing feedback voltage reflecting the n-th offset voltage.

16. A linear regulator circuit comprising:

a first voltage compensator configured to generate a first error voltage based on a difference between a first reference voltage and a first feedback voltage;

a first power transistor connected between an output node and a power supply voltage terminal and configured to receive the first error voltage;

a first switching circuit configured to select one of a plurality of input voltages in response to a selection control signal and to provide the first reference voltage to the first voltage compensator; and a second switching circuit configured to provide either one of a voltage sensing feedback voltage and a first current sensing feedback voltage based on first current flowing to the output node as the first feedback voltage, the voltage sensing feedback voltage being a division of a voltage on the output node.

17. The linear regulator circuit of claim 16, further comprising:

a second power transistor connected between the power supply voltage terminal and a current sensing node and configured to transmit current generated by mirroring the first current to the current sensing node; and a current sensing circuit connected between the current sensing node and a ground terminal and configured to generate the first current sensing feedback voltage based on the current generated by mirroring the first current.

18. The linear regulator circuit of claim 16, wherein the first switching circuit is configured to provide an input voltage associated with a target voltage among a plurality of reference voltages to the first voltage compensator as the first reference voltage in response to the selection control signal being a first signal, and the second switching circuit is configured to provide the voltage sensing feedback voltage to the first voltage compensator as the first feedback voltage in response to the selection control signal being the first signal.

19. The linear regulator circuit of claim 16, wherein the first switching circuit is configured to provide an input voltage associated with target current among the plurality of input voltages to the first voltage compensator as the first reference voltage in response to the selection control signal being a second signal, and the second switching circuit is configured to provide the first current sensing feedback voltage to the first voltage compensator as the first feedback voltage in response to the selection control signal being the second signal.

* * * * *